(12) United States Patent  
Schmidtlin

(10) Patent No.: US 10,416,454 B2  
(45) Date of Patent: Sep. 17, 2019

(54) COMBINATION PRISM ARRAY FOR FOCUSING LIGHT

(71) Applicant: Facebook Technologies, LLC, Menlo Park, CA (US)

(72) Inventor: Edouard G H Schmidtlin, San Francisco, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 103 days.

(21) Appl. No.: 15/422,403

(22) Filed: Feb. 1, 2017

(65) Prior Publication Data

US 2017/0139213 A1    May 18, 2017

Related U.S. Application Data

(63) Continuation-in-part of application No. 15/270,803, filed on Sep. 20, 2016, now Pat. No. 10,061,062.

(Continued)

(51) Int. Cl.  
*G02B 27/01* (2006.01)  
*G02B 5/04* (2006.01)  
(Continued)

(52) U.S. Cl.  
CPC ....... *G02B 27/0172* (2013.01); *G02B 3/0043* (2013.01); *G02B 3/0056* (2013.01);  
(Continued)

(58) Field of Classification Search  
CPC .. G02B 3/0006; G02B 3/0037; G02B 3/0043; G02B 3/005; G02B 3/0056;  
(Continued)

(56) References Cited

U.S. PATENT DOCUMENTS 4,769,750 A * 9/1988 Matsumoto .......... G02B 3/0043  
353/38  
5,016,282 A   5/1991 Tomono et al.  
(Continued)

FOREIGN PATENT DOCUMENTS

JP       57207217 A    12/1982  
WO    WO20130144311 A1    10/2013

OTHER PUBLICATIONS

Jepsen, Final Office Action, U.S. Appl. No. 15/065,772, dated Nov. 3, 2017, 16 pgs.

(Continued)

*Primary Examiner* — Nicholas R. Pasko  
(74) *Attorney, Agent, or Firm* — Morgan, Lewis & Bockius LLP

(57) ABSTRACT

A beam deflection device includes two arrays of prisms. The prisms in the first array of prisms have an apex angle below a critical angle such that light passes through the prism and is deflected at an angle below a specified angle. The prisms in the second array of prisms have an apex angle above the critical angle such that light that enters the prism will reflect off the apex surface to an exit surface, resulting in the light being deflected at an angle above the specified angle. In some embodiments, the prisms in the first array and the second array work in conjunction to direct light from multiple locations to a single focal point.

19 Claims, 30 Drawing Sheets

Related U.S. Application Data

(60) Provisional application No. 62/246,117, filed on Oct. 25, 2015.

(51) Int. Cl.
  *G02B 5/09* (2006.01)
  *G02B 3/00* (2006.01)
  *G02B 27/30* (2006.01)

(52) U.S. Cl.
  CPC ............ *G02B 3/0062* (2013.01); *G02B 5/045* (2013.01); *G02B 5/09* (2013.01); *G02B 27/0176* (2013.01); *G02B 27/30* (2013.01); *G02B 2027/0118* (2013.01); *G02B 2027/0123* (2013.01); *G02B 2027/0178* (2013.01)

(58) Field of Classification Search
  CPC .... G02B 3/0062; G02B 3/0068; G02B 27/01; G02B 27/0101; G02B 27/0103; G02B 27/017; G02B 27/0172; G02B 27/0179; G02B 2027/0105–2027/0147; G02B 2027/0185
  USPC .......................................... 359/630–633, 721
  See application file for complete search history.

(56) References Cited

U.S. PATENT DOCUMENTS

| | | | |
|---|---|---|---|
| 5,414,559 A * | 5/1995 | Burghardt | ............ B23K 26/067 |
| | | | 359/599 |
| 5,619,373 A | 4/1997 | Meyerhofer et al. | |
| 5,742,262 A | 4/1998 | Tabata et al. | |
| 5,748,375 A | 5/1998 | Yamana | |
| 5,758,940 A * | 6/1998 | Ogino | .................... G03B 21/14 |
| | | | 348/E9.027 |
| 5,883,606 A | 3/1999 | Smoot | |
| 6,133,687 A | 10/2000 | Clarke | |
| 6,140,980 A | 10/2000 | Spitzer et al. | |
| 6,215,593 B1 * | 4/2001 | Bruce | ..................... G02B 6/08 |
| | | | 359/619 |
| 6,381,072 B1 | 4/2002 | Burger | |
| 7,573,640 B2 | 8/2009 | Nivon et al. | |
| 7,701,648 B2 * | 4/2010 | Amano | .................... G02B 3/08 |
| | | | 359/742 |
| 8,218,212 B2 | 7/2012 | Kroll et al. | |
| 8,611,004 B2 | 12/2013 | Newell | |
| 8,941,932 B2 * | 1/2015 | Kamiyama | .............. G02B 3/08 |
| | | | 359/742 |
| 9,335,548 B1 | 5/2016 | Cakmakci | |
| 9,810,909 B2 * | 11/2017 | Kang | ................. G02B 27/0172 |
| 2001/0043163 A1 | 11/2001 | Waldern | |
| 2002/0033442 A1 | 3/2002 | Toko et al. | |
| 2002/0158813 A1 | 10/2002 | Kiyokawa et al. | |
| 2003/0025881 A1 | 2/2003 | Hwang | |
| 2004/0108971 A1 | 6/2004 | Waldern et al. | |
| 2004/0227703 A1 | 11/2004 | Lamvik et al. | |
| 2004/0252277 A1 | 12/2004 | Chmielewski, Jr. et al. | |
| 2005/0142303 A1 | 6/2005 | Ota | |
| 2006/0050398 A1 | 3/2006 | Gurevich | |
| 2006/0066785 A1 | 3/2006 | Moriya | |
| 2006/0103924 A1 | 5/2006 | Katz | |
| 2007/0035829 A1 | 2/2007 | Woodgate et al. | |
| 2007/0159599 A1 | 7/2007 | Yamada | |
| 2007/0252074 A1 | 11/2007 | Ng | |
| 2008/0106489 A1 | 5/2008 | Brown | |
| 2008/0239420 A1 | 10/2008 | McGrew | |
| 2008/0297898 A1 | 12/2008 | Martin | |
| 2009/0021716 A1 | 1/2009 | Wangler | |
| 2009/0052838 A1 | 2/2009 | McDowall | |
| 2009/0128899 A1 | 5/2009 | Newell | |
| 2009/0296188 A1 | 12/2009 | Jain et al. | |
| 2010/0141905 A1 | 6/2010 | Burke | |
| 2011/0025955 A1 | 2/2011 | Bos et al. | |
| 2011/0057930 A1 | 3/2011 | Keller | |
| 2011/0069254 A1 | 3/2011 | Takama | |
| 2011/0249452 A1 * | 10/2011 | Chen | ........................ G02B 3/08 |
| | | | 362/339 |
| 2012/0075569 A1 | 3/2012 | Chang | |
| 2012/0188467 A1 | 7/2012 | Escuti et al. | |
| 2012/0242615 A1 | 9/2012 | Teraguchi | |
| 2013/0021226 A1 | 1/2013 | Bell | |
| 2013/0038935 A1 | 2/2013 | Moussa et al. | |
| 2013/0107145 A1 | 5/2013 | Ueki et al. | |
| 2013/0114850 A1 | 5/2013 | Publicover | |
| 2013/0187836 A1 | 7/2013 | Cheng et al. | |
| 2013/0214301 A1 | 8/2013 | Yamada et al. | |
| 2013/0218270 A1 | 8/2013 | Blanckaert et al. | |
| 2013/0234935 A1 | 9/2013 | Griffith | |
| 2013/0242555 A1 | 9/2013 | Mukawa | |
| 2013/0286053 A1 | 10/2013 | Fleck et al. | |
| 2013/0335795 A1 | 12/2013 | Song et al. | |
| 2014/0085865 A1 | 3/2014 | Yun et al. | |
| 2014/0118829 A1 | 5/2014 | Ma et al. | |
| 2014/0140653 A1 | 5/2014 | Brown et al. | |
| 2014/0168034 A1 | 6/2014 | Luebke et al. | |
| 2014/0240342 A1 | 8/2014 | Xu | |
| 2014/0267205 A1 | 9/2014 | Nestorovic | |
| 2014/0267958 A1 | 9/2014 | Sugita | |
| 2014/0361957 A1 | 12/2014 | Hua et al. | |
| 2014/0375541 A1 | 12/2014 | Nister et al. | |
| 2014/0375913 A1 | 12/2014 | Jen et al. | |
| 2015/0015814 A1 | 1/2015 | Qin | |
| 2015/0049390 A1 | 2/2015 | Lanman et al. | |
| 2015/0077618 A1 | 3/2015 | Ueno | |
| 2015/0085259 A1 | 3/2015 | Schreiber et al. | |
| 2015/0091789 A1 * | 4/2015 | Alzate | ................ G02B 27/0172 |
| | | | 345/156 |
| 2015/0124315 A1 * | 5/2015 | Sasahara | ................ G02B 3/005 |
| | | | 359/457 |
| 2015/0138451 A1 | 5/2015 | Amitai | |
| 2015/0173846 A1 | 6/2015 | Schneider | |
| 2015/0185699 A1 * | 7/2015 | Yamamoto | ........... G03H 1/2205 |
| | | | 359/9 |
| 2015/0205014 A1 | 7/2015 | Akasaka | |
| 2015/0205132 A1 | 7/2015 | Osterhout | |
| 2015/0262424 A1 | 9/2015 | Tabaka et al. | |
| 2015/0287206 A1 | 10/2015 | Ebisawa | |
| 2015/0312558 A1 | 10/2015 | Miller et al. | |
| 2015/0338660 A1 | 11/2015 | Mukawa | |
| 2016/0018645 A1 | 1/2016 | Haddick | |
| 2016/0033769 A1 * | 2/2016 | Kang | ................. G02B 27/0172 |
| | | | 359/13 |
| 2016/0062121 A1 | 3/2016 | Border | |
| 2016/0091715 A1 | 3/2016 | Larson | |
| 2016/0131918 A1 | 5/2016 | Chu et al. | |
| 2016/0165151 A1 | 6/2016 | Corlett | |
| 2016/0191890 A1 | 6/2016 | Kawano et al. | |
| 2016/0259198 A1 | 9/2016 | Yi | |
| 2016/0274365 A1 | 9/2016 | Bailey | |
| 2016/0314564 A1 | 10/2016 | Jones et al. | |
| 2016/0327798 A1 | 11/2016 | Xiao | |
| 2016/0349414 A1 | 12/2016 | Rudmann | |
| 2017/0010473 A1 | 1/2017 | Ide | |
| 2017/0010488 A1 | 1/2017 | Klug et al. | |
| 2017/0018215 A1 | 1/2017 | Black et al. | |
| 2017/0018688 A1 | 1/2017 | Mazed et al. | |
| 2017/0019602 A1 | 1/2017 | Dopilka et al. | |
| 2017/0031435 A1 | 2/2017 | Raffle | |
| 2017/0038589 A1 | 2/2017 | Jepsen | |
| 2017/0038590 A1 | 2/2017 | Jepsen | |
| 2017/0038591 A1 | 2/2017 | Jepsen | |
| 2017/0038834 A1 | 2/2017 | Wilson | |
| 2017/0038836 A1 | 2/2017 | Jepsen | |
| 2017/0039904 A1 | 2/2017 | Jepsen | |
| 2017/0039905 A1 | 2/2017 | Jepsen | |
| 2017/0039906 A1 | 2/2017 | Jepsen | |
| 2017/0039907 A1 | 2/2017 | Jepsen | |
| 2017/0039960 A1 | 2/2017 | Jepsen | |
| 2017/0075421 A1 | 3/2017 | Na | |
| 2017/0091549 A1 | 3/2017 | Gustafsson | |
| 2017/0102543 A1 | 4/2017 | Vallius | |
| 2017/0108697 A1 | 4/2017 | El-Ghoroury et al. | |
| 2017/0139213 A1 | 5/2017 | Schmidtlin | |

(56) References Cited

U.S. PATENT DOCUMENTS

2017/0293148 A1   10/2017   Park
2017/0336626 A1   11/2017   Hayashi
2018/0046859 A1    2/2018   Jarvenpaa

OTHER PUBLICATIONS

Jepsen, Final Office Action, U.S. Appl. No. 15/065,780, dated Mar. 28, 2018, 17 pgs.
Jepsen, Office Action, U.S. Appl. No. 15/065,780, dated Jul. 9, 2018, 21 pgs.
Jepsen, Final Office Action, U.S. Appl. No. 15/065,785, dated Mar. 28, 2018, 17 pgs.
Jepsen, Final Office Action, U.S. Appl. No. 15/065,790, dated Apr. 18, 2018, 17 pgs.
Jepsen, Final Office Action, U.S. Appl. No. 15/065,796, dated Apr. 26, 2018, 22 pgs.
Jepsen, Notice of Allowance, U.S. Appl. No. 15/065,772, dated Jan. 29, 2018, 8 pgs.
Jepsen, Notice of Allowance, U.S. Appl. No. 15/065,778, dated Apr. 9, 2018, 12 pgs.
Jepsen, Office Action, U.S. Appl. No. 15/065,772, dated Jun. 29, 2017, 16 pgs.
Jepsen, Office Action, U.S. Appl. No. 15/065,778, dated Oct. 29, 2017, 29 pgs.
Jepsen, Office Action, U.S. Appl. No. 15/065,780, dated Oct. 29, 2017, 20 pgs.
Jepsen, Office Action, U.S. Appl. No. 15/065,785, dated Oct. 27, 2017, 21 pgs.
Jepsen, Office Action, U.S. Appl. No. 15/065,790, dated Nov. 8, 2017, 24 pgs.
Jepsen, Office Action, U.S. Appl. No. 15/065,796, dated Nov. 8, 2017, 26 pgs.
Jepsen, Office Action, U.S. Appl. No. 15/065,811, dated May 11, 2018, 17 pgs.
Jepsen, Office Action, U.S. Appl. No. 15/065,813, dated May 17, 2018, 12 pgs.
Jepsen, Office Action, U.S. Appl. No. 15/065,817, dated Mar. 29, 2018, 11 pgs.
Jepsen, Office Action, U.S. Appl. No. 15/967,451, dated Jun. 15, 2018, 13 pgs.
Lanman et al., "Near-Eye Light Field Displays," ACM Transactions on Graphics, vol. 32, No. 6, Article 220, Publication Date: Nov. 2013, 10 pgs.
Shi, Final Office Action, U.S. Appl. No. 15/347,684, dated Nov. 6, 2017, 12 pgs.
Shi, Notice of Allowance, U.S. Appl. No. 15/347,684, dated Jan. 24, 2018, 5 pgs.
Shi, Office Action, U.S. Appl. No. 15/226,815, dated Apr. 5, 2018, 15 pgs.
Shi, Office Action, U.S. Appl. No. 15/226,820, dated Mar. 28, 2018, 10 pgs.
Shi, Office Action, U.S. Appl. No. 15/347,684, dated Jun. 29, 2017, 13 pgs.
Shi, Office Action, U.S. Appl. No. 15/347,684, dated Jul. 11, 2018, 11 pgs.
Shi, Office Action, U.S. Appl. No. 15/347,685, dated Jun. 26, 2018, 11 pgs.
Shroff, Office Action, U.S. Appl. No. 15/395,107, dated May 14, 2018, 11 pgs.
Schmidtlin, Notice of Allowance, U.S. Appl. No. 15/270,803, dated May 2, 2018, 11 pgs.
Schmidtlin, Office Action, U.S. Appl. No. 15/270,803, dated Nov. 29, 2017, 26 pgs.
Blais, Francois, "Review of 20 years of range sensor development," Journal of Electronic Imaging, Jan. 2004, vol. 13(1), pp. 231-243.
Jepsen, Final Office Action, U.S. Appl. No. 15/065,780, dated Dec. 4, 2018, 23 pgs.
Jepsen, Office Action, U.S. Appl. No. 15/065,785, dated Sep. 13, 2018, 21 pgs.
Jepsen, Office Action, U.S. Appl. No. 15/065,817, dated Dec. 27, 2018, 11 pgs.
Jepsen, Notice of Allowance, U.S. Appl. No. 15/065,790, dated Aug. 15, 2018, 13 pgs.
Jepsen, Office Action, U.S. Appl. No. 15/065,796, dated Sep. 13, 2018, 24 pgs.
Jepsen, Final Office Action, U.S. Appl. No. 15/065,811, dated Dec. 13, 2018, 8 pgs.
Jepsen, Final Office Action, U.S. Appl. No. 15/065,813, dated Dec. 18, 2018, 15 pgs.
Jepsen, Final Office Action, U.S. Appl. No. 15/967,451, dated Oct. 11, 2018, 17 pgs.
Shi, Notice of Allowance, U.S. Appl. No. 15/347,684, dated Jan. 7, 2019, 7 pgs.
Shi, Notice of Allowance, U.S. Appl. No. 15/226,815, dated Sep. 24, 2018, 9 pgs.
Shi, Final Office Action, U.S. Appl. No. 15/226,820, dated Aug. 6, 2018, 13 pgs.
Shi, Notice of Allowance, U.S. Appl. No. 15/226,820, dated Nov. 19, 2018, 10 pgs.
Shi, Office Action, U.S. Appl. No. 15/347,691, dated Nov. 1, 2018, 10 pgs.
Shroff, Final Office Action, U.S. Appl. No. 15/395,107, dated Dec. 12, 2018, 13 pgs.
Jepsen, Notice of Allowance, U.S. Appl. No. 15/065,785, dated Apr. 24, 2019, 12 pgs.
Jepsen, FinalOffice Action, U.S. Appl. No. 15/065,796, dated Apr. 25, 2019, 25 pgs.
Jepsen, Notice of Allowance, U.S. Appl. No. 15/065,811, dated Feb. 13, 2019, 9 pgs.
Jepsen, Office Action, U.S. Appl. No. 15/065,813, dated Apr. 1, 2019, 15 pgs.
Jepsen, Notice of Allowance, U.S. Appl. No. 15/967,451, dated Feb. 25, 2019, 9 pgs.
Shi, Notice of Allowance, U.S. Appl. No. 15/347,685, dated May 2, 2019, 7 pgs.
Shi, Notice of Allowance, U.S. Appl. No. 15/347,691, dated Feb. 27, 2019, 7 pgs.
Shi, Office Action, U.S. Appl. No. 15/347,672, dated Feb. 21, 2019, 12 pgs.
Shroff, Office Action, U.S. Appl. No. 15/395,107, dated Mar. 15, 2019, 15 pgs.

* cited by examiner

COMBINATION PRISM ARRAY FOR FOCUSING LIGHT

RELATED APPLICATIONS

This application is a continuation-in-part of U.S. patent application Ser. No. 15/270,803, filed Sep. 20, 2016, which claims the priority to U.S. Provisional Patent Application Ser. No. 62/246,117, filed Oct. 25, 2015, both of which are incorporated by reference herein in their entireties. This application is related to U.S. patent application Ser. No. 15/065,772, filed Mar. 9, 2016; U.S. patent application Ser. No. 15/065,778, filed Mar. 9, 2016; and U.S. patent application Ser. No. 15/270,803, filed Sep. 20, 2016, all of which are incorporated by reference herein in their entireties.

TECHNICAL FIELD

This relates generally to display devices, and more specifically to head-mounted display devices.

BACKGROUND

Head-mounted display devices (also called herein head-mounted displays) are gaining popularity as means for providing visual information to user. A large field of view is required to provide an immersive virtual reality and/or augmented reality experience. This allows users to look in different directions (by moving his or her eye) and still see projected visual information.

However, pixels of a display screen are configured to project light in a direction perpendicular to the screen. The pixels, when viewed at an angle (e.g., especially at an angle outside a viewing angle of the pixels), appear dim. Thus, pixels located in a center region of the display screen appear brighter than pixels located in a peripheral region of the display screen, which reduces viewing experience of users.

SUMMARY

Accordingly, there is a need for an optical element that can direct (or focus) light, including light from the central region and the peripheral region of the display screen, toward a single location, such as at a user's eye, thereby enhancing the user's virtual-reality and/or augmented reality experience. There is a further need to direct the light in a portable system that can be mounted on a user's head.

The above deficiencies and other problems associated with conventional head-mounted displays are reduced or eliminated by the disclosed beam deflection devices. In some embodiments, the device is a head-mounted display device. In some embodiments, the device is portable.

In accordance with some embodiments, a beam deflector device includes a single integrated substrate that has a planar entrance surface and a non-planar exit surface. The single integrated substrate includes, on the non-planar exit surface, a first array of light-steering components. A respective component of the first array of light-steering components is located at a respective distance less than a predefined distance from a reference point. The respective component of the first array of light-steering components includes an optical prism having an apex angle that is less than a critical angle. The first array of light-steering components includes a first prism having a first apex angle and a second prism having a second apex angle that is distinct from the first apex angle. The single integrated substrate also includes, on the non-planar exit surface, a second array of light-steering components. A respective component of the second array of light-steering components is located at a respective distance greater than the predefined distance from the reference point. The respective component of the second array of light-steering components includes an optical prism having an apex angle that is greater than the critical angle. In some embodiments, the second array of light-steering components includes a third prism having a third apex angle that is distinct from the first apex angle and the second apex angle and a fourth prism having a fourth apex angle that is distinct from the first apex angle, the second apex angle, and the third apex angle.

In accordance with some embodiments, a display device includes a two-dimensional array of pixels. Each pixel is configured to output light so that the two-dimensional array of pixels outputs a respective pattern of light. The display device also includes any beam deflector device described herein, which is configured to transmit the respective pattern of light from the two-dimensional array of pixels.

In accordance with some embodiments, a method (e.g., performed at a display device) includes outputting a respective pattern of light from a two-dimensional array of pixels; and transmitting the respective pattern of light through any beam deflector device described herein.

Thus, the disclosed embodiments provide optical elements that can direct light from peripheral regions of display devices toward at a user's eye with increased efficiency and effectiveness, which, in turn, increases user satisfaction with such devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1:
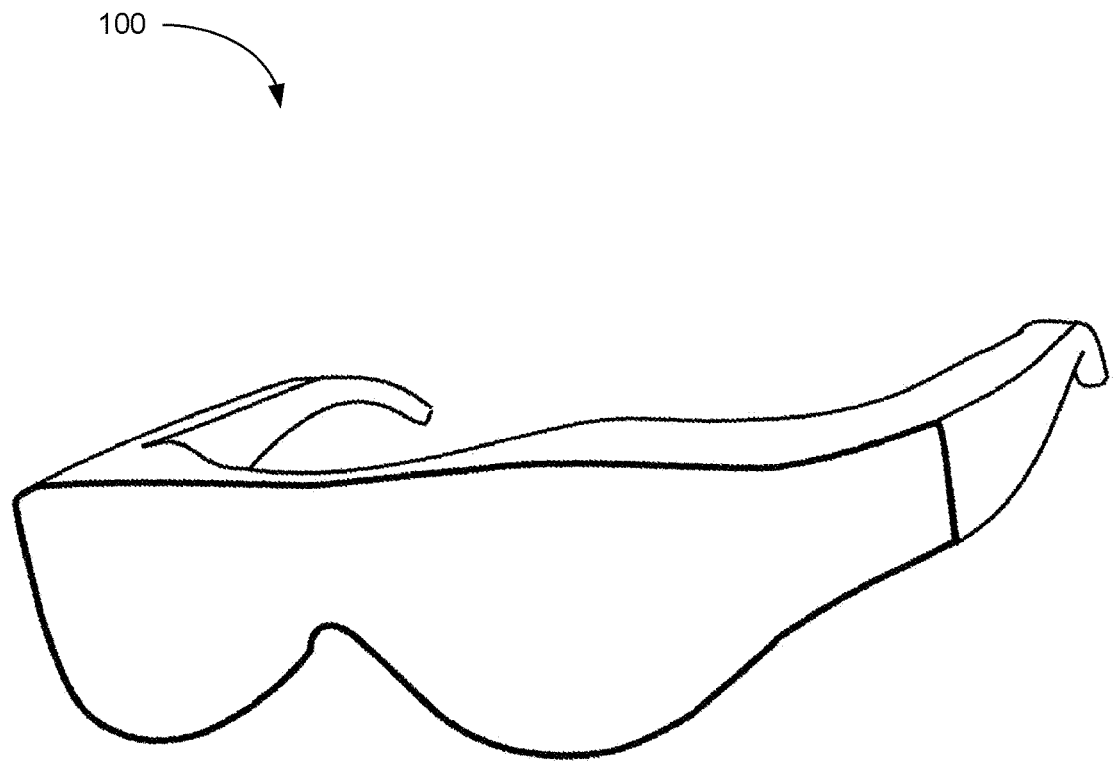
FIG. 1 is a perspective view of a display device in accordance with some embodiments.

These figures are not drawn to scale unless indicated otherwise.

DETAILED DESCRIPTION

Conventional head-mounted displays are larger and heavier than typical eyeglasses, because conventional head-mounted displays often include a complex set of optics that can be bulky and heavy. Although a large field of view is required to provide an immersive virtual reality and/or augmented reality experience, a conventional display screen is configured to project light in a direction perpendicular to the display screen. As a result, light emitted by peripheral regions of the display screen is not well directed to an eye of a user. Thus, there is a need for an optical element that can direct (or focus) light, including light from the central region and the peripheral region of a large display screen, toward an eye of the user. However, such optical element can be large and heavy, which further increases the size and weight of head-mounted displays. It is not easy for users to get used to wearing such large and heavy head-mounted displays.

The disclosed embodiments, by utilizing a first array of prisms to perform small deflections of light from a central region of the display and a second array of prisms to perform larger deflections of light from a peripheral region of the display, allow direction of light from a large display screen, such light from each light source in the display screen (e.g., pixels) will be directed toward an eye of a user. This facilitates light emitted from the display screen to be delivered efficiently and effectively to an eye of the user, regardless of whether the user is looking straight ahead or has moved his eyeball to look up, down, left, or right, thereby providing an improved user experience with the display devices.

Because a total internal reflection (TIR) of a prism of the second array of prisms is used to provide a large deflection (e.g., a deflection of 45 degrees or above), optical artifacts associated with diffractive or holographic optics (e.g., diffraction, hazing, etc.) are reduced.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first prism could be termed a second prism, and, similarly, a second prism could be termed a first prism, without departing from the scope of the various described embodiments. The first prism and the second prism are both prisms, but they are not the same prism.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user).

In some embodiments, display device 100 includes one or more components described below with respect to FIG. 2. In some embodiments, display device 100 includes additional components not shown in FIG. 2.

Figure 2:
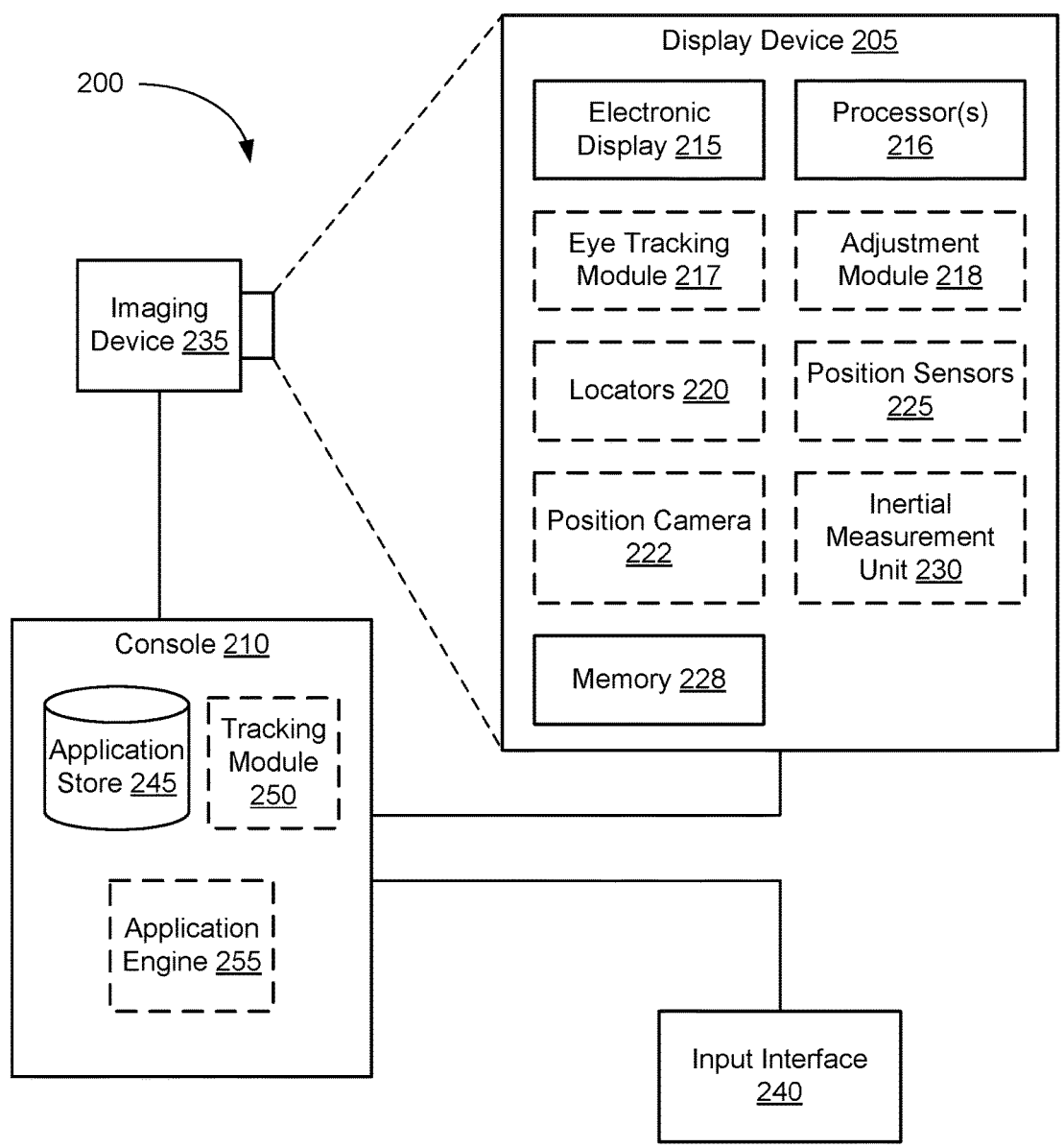
FIG. 2 is a block diagram of system including a display device in accordance with some embodiments.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and augmented reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an AR device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores the following programs, modules and data structures, or a subset or superset thereof:
  instructions for activating at least a subset of a two-dimensional array of tiles for outputting, from at least the subset of the two-dimensional array of tiles, a collective pattern of light that is directed to a pupil of an eye of a user;
  instructions for, prior to activating at least the subset of the two-dimensional array of tiles, selecting the subset of the two-dimensional array of tiles for activation;
  instructions for directing the light from each pixel that outputs light to a pupil of an eye of a user; and
  instructions for activating at least the subset of the two-dimensional array of tiles include instructions for activating less than all of the tiles of the two-dimensional array of tiles.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user). As discussed in detail below with regard to FIGS. 3A-3G, an adjustable electronic display element is comprised of a display element, one or more integrated microlens arrays, or some combination thereof. The adjustable electronic display element may be flat, cylindrically curved, or have some other shape.

In some embodiments, the display element includes an array of light emission devices and a corresponding array of emission intensity array. An emission intensity array is an array of electro-optic pixels, opto-electronic pixels, some other array of devices that dynamically adjust the amount of light transmitted by each device, or some combination thereof. These pixels are placed behind an array of microlenses, and are arranged in groups. Each group of pixels outputs light that is directed by the microlens in front of it to a different place on the retina where light from these groups of pixels are then seamlessly "tiled" to appear as one continuous image. In some embodiments, computer graphics, computational imaging and other techniques are used to pre-distort the image information (e.g., correcting for the brightness variations) sent to the pixel groups so that through the distortions of the system from optics, electronics, electro-optics, and mechanicals, a smooth seamless image appears on the back of the retina, as described below with respect to FIGS. 4A and 4B. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

The microlens arrays are arrays of lenslets that direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205 for viewing images from display device 205). In some cases, the eyebox is represented as a 10 mm×10 mm square (see, e.g., FIG. 3D). In some embodiments, a lenslet is a conventional passive lens (e.g., glass lens, plastic lens, etc.) or an active lens (e.g., liquid crystal lens, liquid lens, etc.). In some embodiments, display device 205 dynamically adjusts the curvature and/or refractive ability of active lenslets to direct light to specific locations within each eyebox (e.g., location of pupil). In some embodiments, one or more of the microlens arrays include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image—and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. This sends a discrete image to the display that will tile subimages together thus a coherent stitched image will appear on the back of the retina. A small portion of each image is projected through each lenslet in the lenslet array. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenslets in the microlens arrays, or some combination thereof.

In some embodiments, adjustment module 218 is configured to instruct the display elements to not use every pixel (e.g., one or more light emission devices), such that black spaces aperture the diverging light to abut the image together from the retinal perspective. In addition, in some embodiments, gaps are created between the pixel groups or "tiles" to match divergence of the light source array and the magnification of the group of pixels as it transverses through the optical system and fully fills the lenslet. In some embodiments, adjustment module 218 determines, for a given position of an eye, which pixels are turned on and which pixels are turned off—with the resulting image being seamlessly tiled on the eye's retina.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 1, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3A:
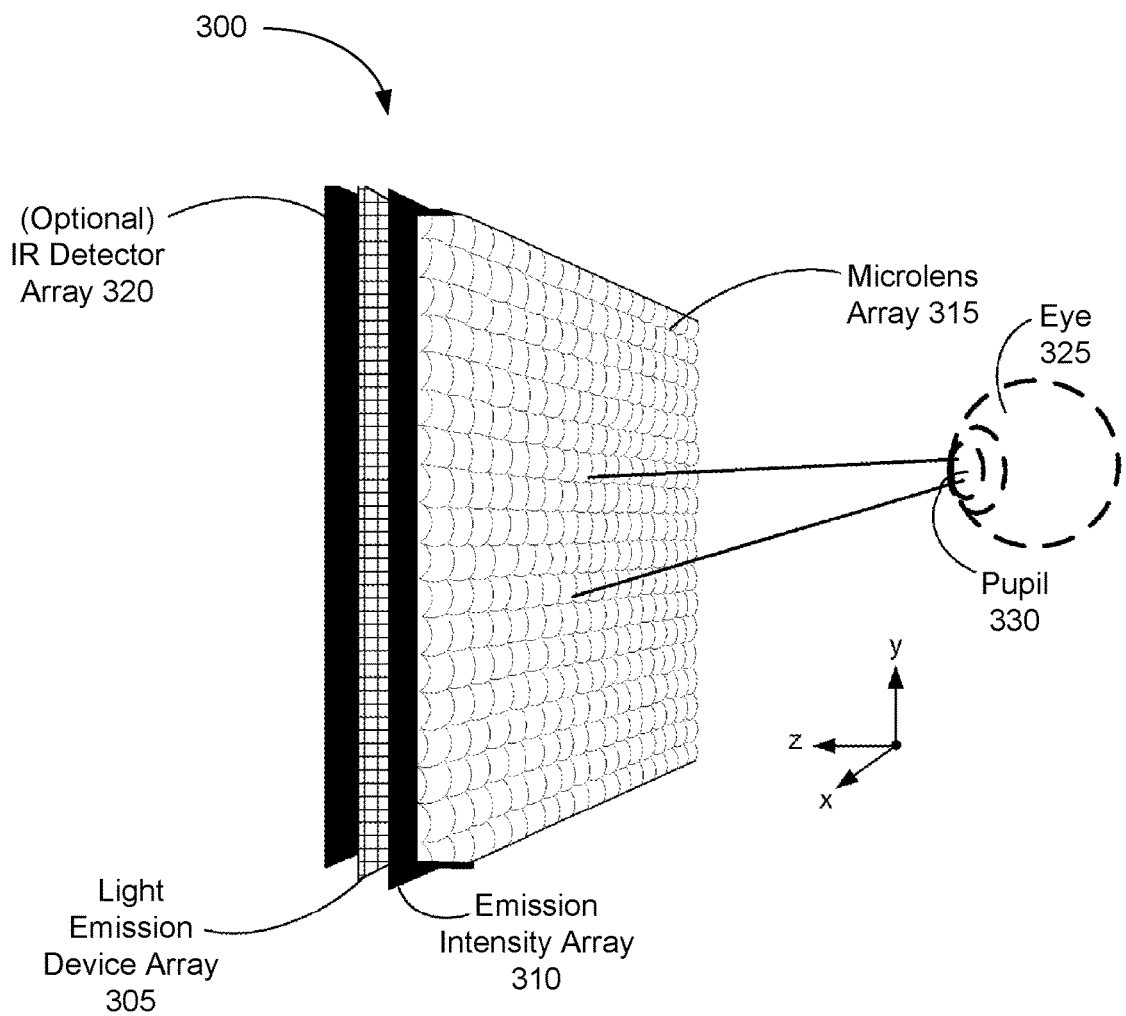
FIG. 3A is an isometric view of an adjustable electronic display element of a display device in accordance with some embodiments.

FIG. 3A is an isometric view of an adjustable electronic display element 300 of display device 205, in accordance with some embodiments. In some other embodiments, adjustable electronic display element 300 is part of some other electronic display (e.g., digital microscope, etc.). In some embodiments, adjustable electronic display element 300 includes light emission device array 305, emission intensity array 310, microlens array 315, and IR detector array 320. In some other embodiments, adjustable electronic display element 300 includes a subset or superset of light emission device array 305, emission intensity array 310, microlens array 315, and IR detector array 320 (e.g., adjustable electronic display element 300 includes an adjustable light emission device array that includes individually adjustable pixels and microlens array 315, without a separate emission intensity array).

Light emission device array 305 emits image light and optional IR light toward the viewing user. Light emission device array 305 may be, e.g., an array of LEDs, an array of microLEDs, an array of OLEDs, or some combination thereof. Light emission device array 305 includes light emission devices that emit light in the visible light (and optionally includes devices that emit light in the IR).

Emission intensity array 310 is configured to selectively attenuate light emitted from light emission array 305. In some embodiments, emission intensity array 310 is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner emission intensity array 310 is able to control what portion of the image light emitted from light emission device array 305 is passed to the microlens array 315. In some embodiments, display device 205 uses emission intensity array 310 to facilitate providing image light to a location of pupil 330 of eye 325 of a user, and minimize the amount of image light provided to other areas in the eyebox.

Microlens array 315 receives the modified image light (e.g., attenuated light) from emission intensity array 310, and directs the modified image light to a location of pupil 330. Microlens array 315 includes a plurality of lenslets. In some embodiments, microlens array 315 includes one or more diffractive optics. A lenslet may be a conventional passive lens (e.g., glass lens, plastic lens, etc.) or an active lens. An active lens is a lens whose lens curvature and/or refractive ability may be dynamically controlled (e.g., via a change in applied voltage). An active lens may be a liquid crystal lens, a liquid lens (e.g., using electro-wetting), or some other lens whose curvature and/or refractive ability may be dynamically controlled, or some combination thereof. Accordingly, in some embodiments, system 200 may dynamically adjust the curvature and/or refractive ability of active lenslets to direct light received from emission intensity array 310 to pupil 330.

Optional IR detector array 320 detects IR light that has been retro-reflected from the retina of eye 325, a cornea of eye 325, a crystalline lens of eye 325, or some combination thereof. IR detector array 320 includes either a single IR sensor or a plurality of IR sensitive detectors (e.g., photodiodes). While IR detector array 320 in FIG. 3A is shown separate from light emission device array 305, in some embodiments, IR detector array 320 may be integrated into light emission device array 305.

In some embodiments, light emission device array 305 and emission intensity array 310 make up a display element. Alternatively, the display element includes light emission device array 305 (e.g., when light emission device array 305 includes individually adjustable pixels) without emission intensity array 310. In some embodiments, the display element additionally includes IR array 320. In some embodiments, in response to a determined location of pupil 335, the display element adjusts the emitted image light such that the light output by the display element is refracted by microlens array 315 toward the location of pupil 335, and not toward other locations in the eyebox.

Figure 3B:
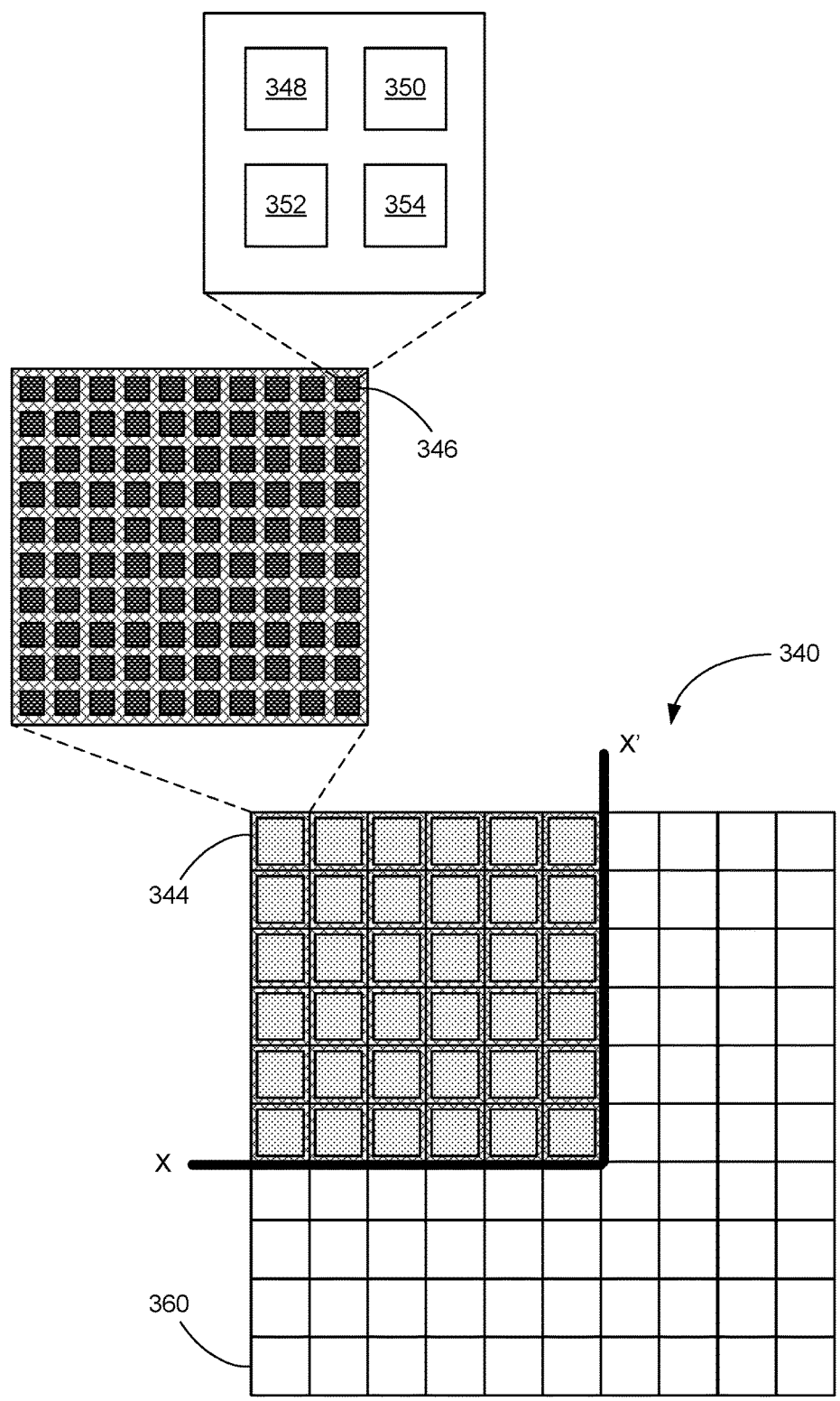
FIG. 3B is a partial cross-sectional view of the adjustable electronic device in accordance with some embodiments.

FIG. 3B is a partial cross-sectional view of adjustable electronic device 340 in accordance with some embodiments.

Adjustable electronic device 340 includes a two-dimensional array of tiles 360 (e.g., 10-by-10 array of tiles 360, as shown in FIG. 3B). In some cases, each tile has a shape of a 1-mm-by-1-mm square, although tiles of different sizes and/or shapes can be used. In some embodiments, the two-dimensional array of tiles 360 is arranged on a flat surface. In some other embodiments, the two-dimensional array of tiles 360 is arranged on a curved surface or a surface of any other shape. Although FIG. 3B shows a square array of tiles 360, in some other embodiments, the two-dimensional array of tiles 360 may have a rectangular shape, or any other shape (e.g., a rasterized circle or a rasterized ellipse). In addition, a different number of tiles 360 may be used depending on the desired performance of the display device (e.g., a field of view).

As explained above, tile 360 includes a lens. In some embodiments, lenses for the two-dimensional array of tiles are provided in a form of a microlens array (e.g., microlens array 315 in FIG. 3A). In FIG. 3B, a portion of the microlens array is not shown (e.g., an upper-left portion of the microlens array indicated by the line XX') to illustrate groups of pixels located behind it.

FIG. 3B also illustrates that each tile 360 includes a two-dimensional array 344 of pixels 346 (e.g., 10-by-10 array of pixels). In some other embodiments, the tiles 360 may include different numbers of pixels (e.g., 40-by-40 pixels).

In some embodiments, the two-dimensional array 344 of pixels 346 does not encompass the entire surface of tile 360, as shown in FIG. 3B. In such embodiments, a portion of tile 360 (e.g., an area along a periphery of tile 360) not covered by the pixels 346 includes electronic circuits for operating pixels 346 on tile 360 (e.g., adjusting individual pixels 346 and/or subpixels to turn on or off).

In FIG. 3B, each pixel 346 includes a plurality of subpixels (e.g., subpixel 348, 350, 352, and 354), where each subpixel corresponds to a respective color. For example, each pixel may include three subpixels, each subpixel outputting light of one of red, green, and blue colors. In another example, each pixel may include four subpixels, each subpixel outputting to one of red, green, blue, and yellow colors (e.g., subpixel 348 outputs red light, subpixel 350 outputs green light, subpixel 352 outputs blue light, and subpixel 354 outputs yellow light). In some cases, this is enabled by placing different color filters in front of the subpixels. In some embodiments, the subpixels in each pixel have the same size (e.g., the red subpixel, the green subpixel, and the blue subpixel have the same size), while in some other embodiments, the subpixels have different sizes (e.g., to compensate for different intensities of light of different colors).

In some embodiments, each tile 360 in the two-dimensional array of tiles has a same configuration. For example, each tile may have the same shape and size, and include a same number of pixels. In some embodiments, tiles in the two-dimensional array of tiles have different configurations (e.g., tiles having one of two different configurations are alternated).

In some embodiments, each tile includes a two-dimensional array of lenses. For example, the tile may have the same number of pixels and lenses so that each pixel is coupled with a respective lens. In some embodiments, each single lens is integrated with a respective pixel (e.g., each single lens is placed on, or included as part of, the respective pixel).

Figure 3C:
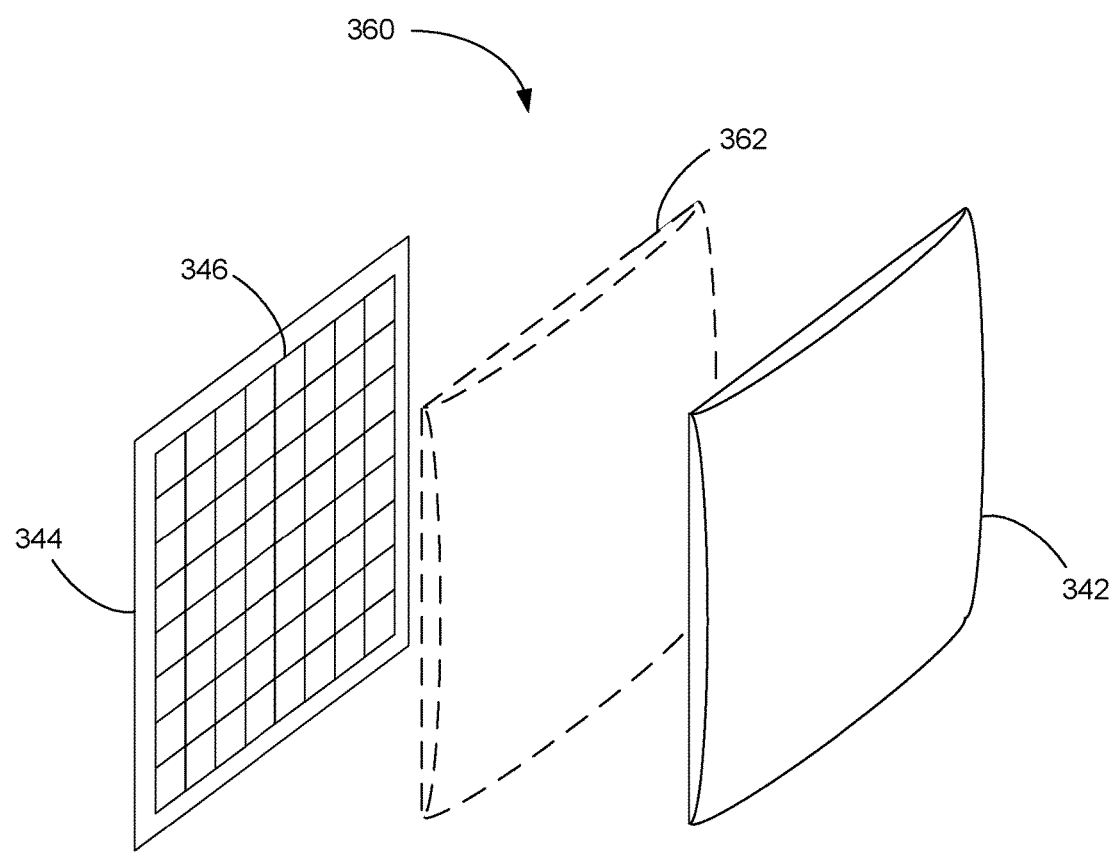
FIG. 3C is a perspective view of a tile in accordance with some embodiments.

FIG. 3C is a perspective view of tile 360 in accordance with some embodiments. As explained above, tile 360 includes two-dimensional array 344 of pixels 346 and lens 342, which may be a lenslet of a microlens array (e.g., microlens array 315 in FIG. 3A). In some embodiments, tile 360 includes a single lens. In some other embodiments, tile 360 includes two or more lenses along the optical axis (e.g., second lens 362 is located between pixels 346 and lens 342).

Figure 3D:
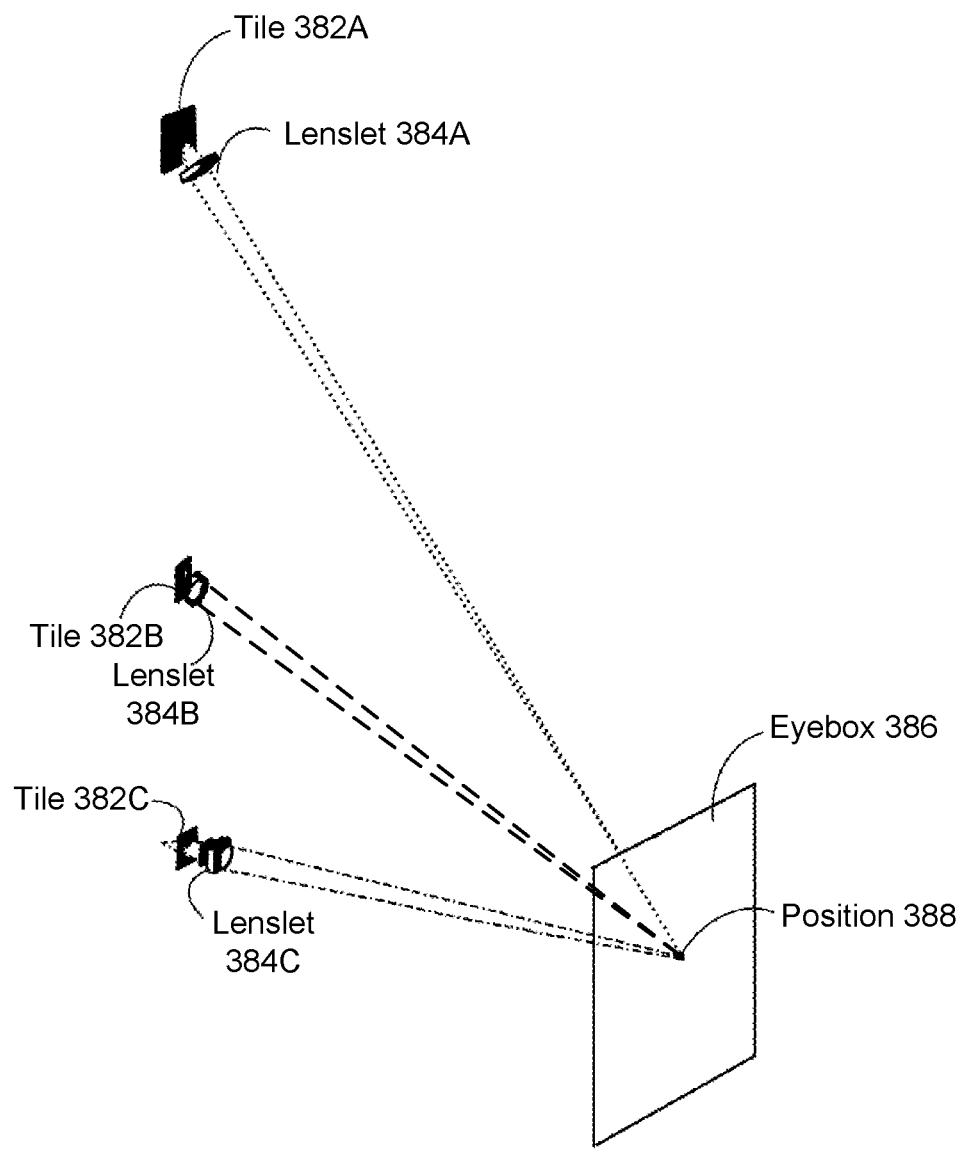
FIG. 3D is a perspective view of a portion of the adjustable electronic display element in accordance with some embodiments.

FIG. 3D is a perspective view of a portion of the adjustable electronic display element in accordance with some embodiments. The perspective view 380 includes a portion of the electronic display element and eyebox 386. For example, the portion includes tiles 382A, 382B, and 382C, and lenslets 384A, 384B, and 384C in those tiles. In some cases, eyebox 386 has a dimension of 10 mm×10 mm, although eyeboxes of different sizes can be used. When pupil 330 is at position 388, the image is rendered for this portion of eyebox 386, and light is directed from different tiles, including tiles 382A, 382B, and 382C to form an image on a retina of the eye.

Figure 3E:
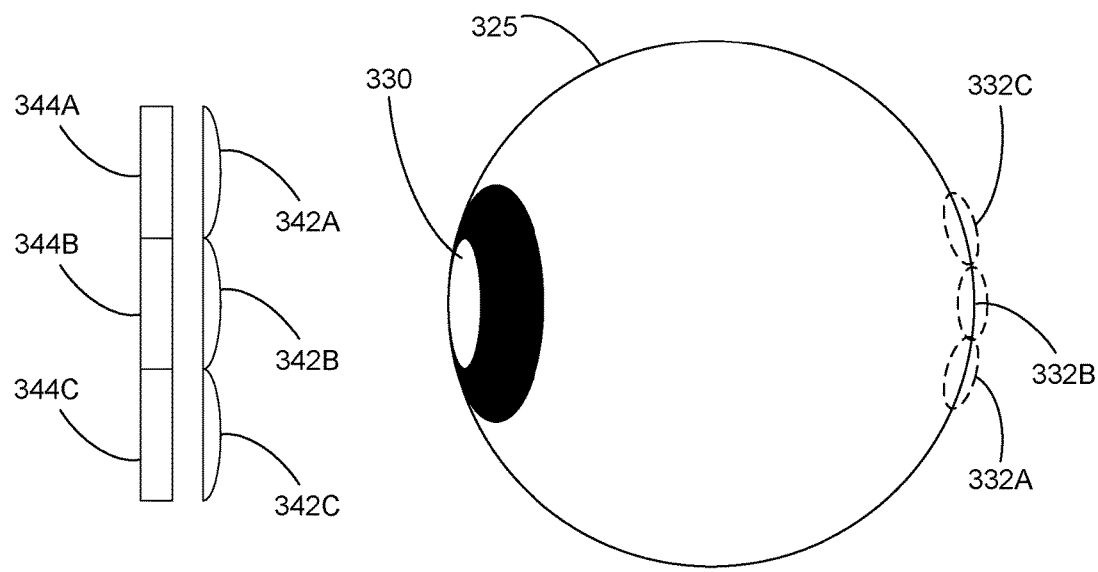
FIGS. 3E-3G are schematic diagrams illustrating an exemplary operation of tiles in accordance with some embodiments.
Figure 3F:
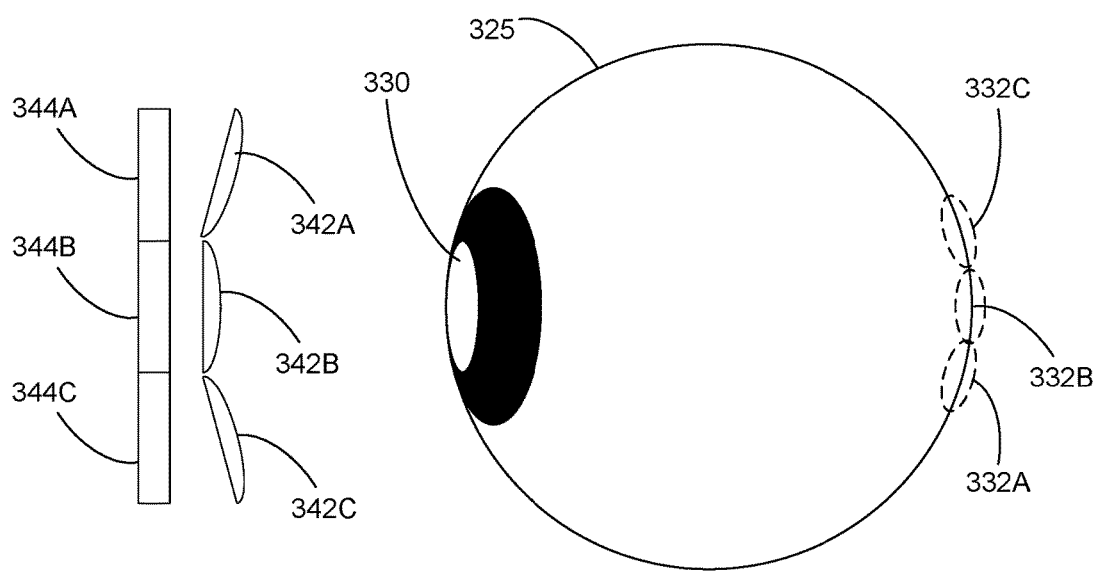
Figure 3G:
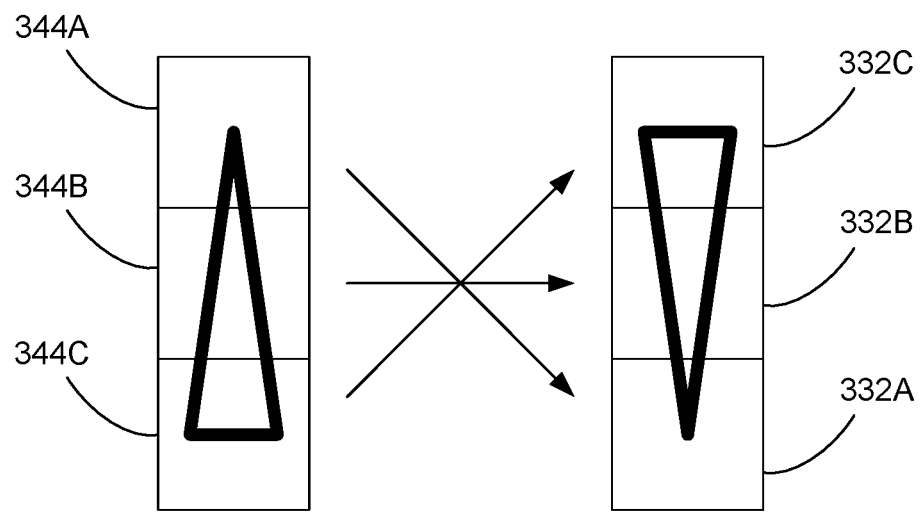

FIGS. 3E-3G are schematic diagrams illustrating exemplary operations of tiles in accordance with some embodiments.

FIG. 3E illustrates three tiles (e.g., a first tile with group 344A of pixels and lens 342A, a second tile with group 344B of pixels and lens 342B, and a third tile with group 344C of pixels and lens 342C). Pixels 344 in each tile render a respective pattern of light, which is directed by lens 342 in the tile to pupil 330 of eye 325. The respective pattern of light from group 344A of pixels forms an image on a first portion 332A of a retina of eye 325, the respective pattern of light from group 344B of pixels forms an image on a second portion 332B of the retina of eye 325, and the respective pattern of light from group 344C of pixels forms an image on a third portion 332C of the retina of eye 325, as shown in FIG. 3G. Thus, the respective patterns of light from pixel groups 344A, 344B, and 344C form a collective pattern of light, which is seamlessly projected onto the retina of eye 325, which is perceived by the eye as a single image. In some embodiments, as shown in FIG. 3F, one or more lenses (e.g., lens 342A and 342C) are tilted to better direct light toward pupil 330 of eye 325.

It should be noted that display devices described herein are distinct from what is known as light field displays. Light field displays project partially overlapping series of images. However, light field displays have a limited field of view. In comparison, the disclosed display devices provide a large field of view that has not been possible with light field displays, and therefore, can be used for a wider range of applications.

Figure 3H:
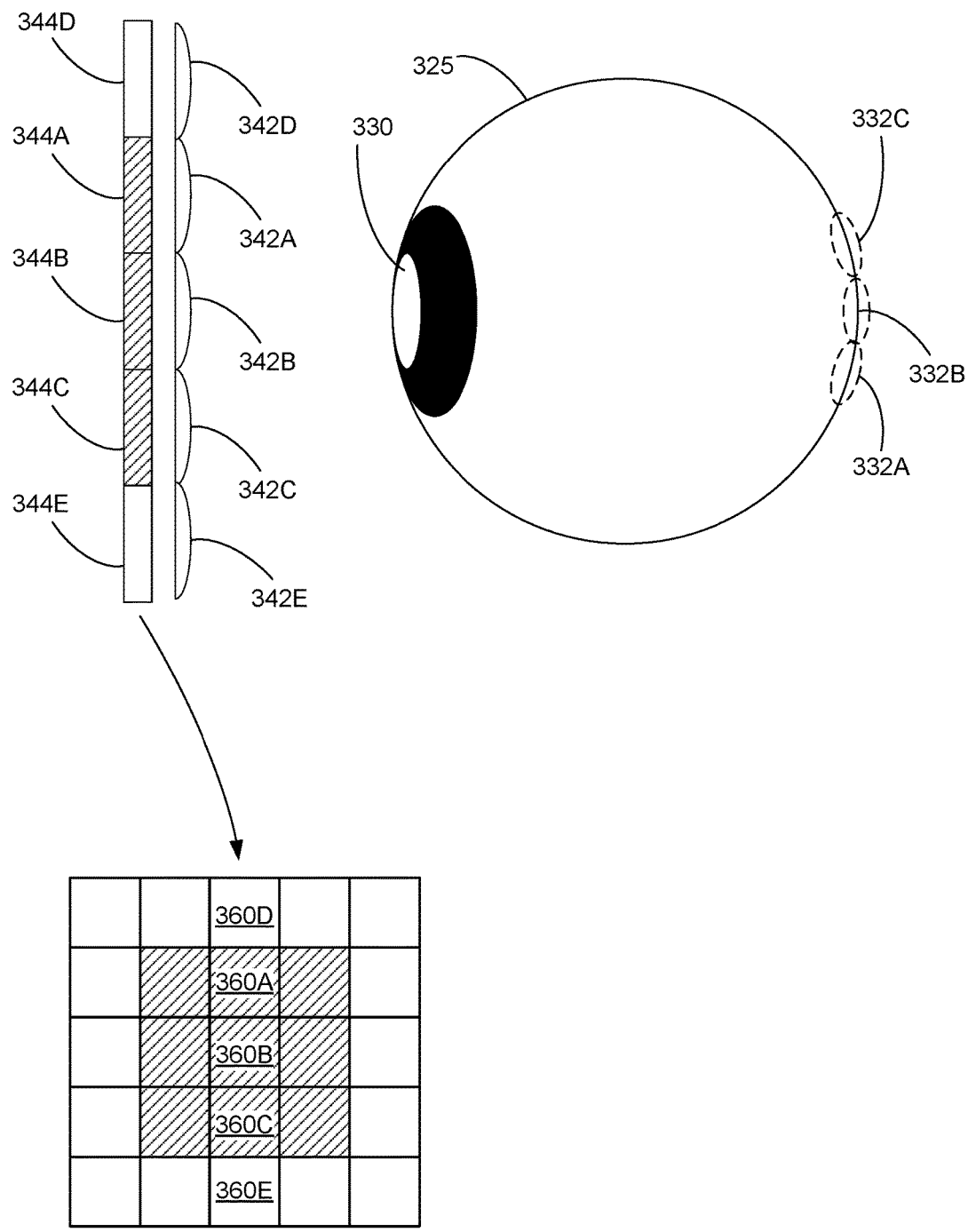
FIGS. 3H-3I are schematic diagrams illustrating exemplary operations of activating a subset of tiles in accordance with some embodiments.
Figure 3I:
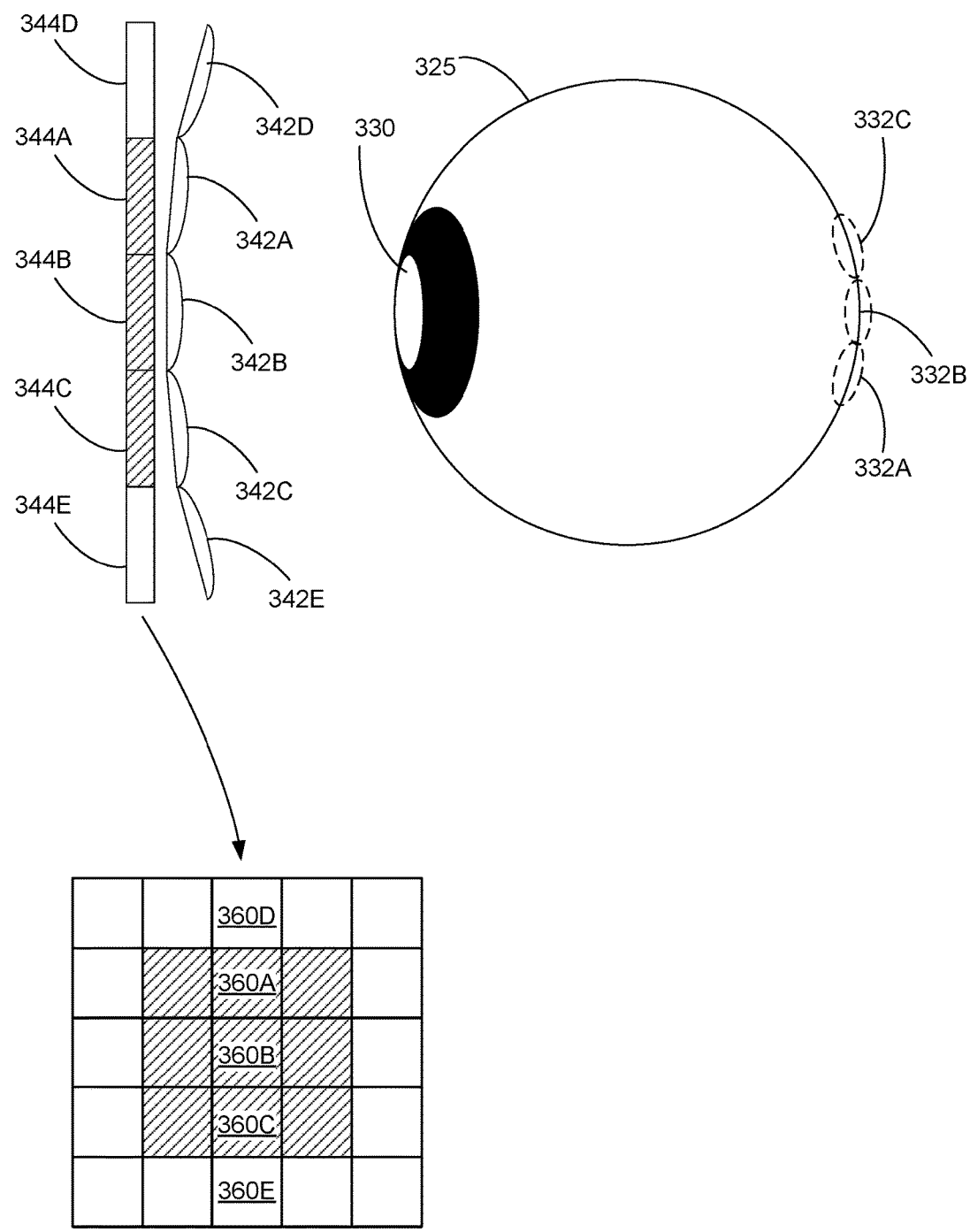

FIGS. 3H and 3I are schematic diagrams illustrating exemplary operations of activating a subset of tiles in accordance with some embodiments. FIG. 3H illustrates an array of 5-by-5 tiles, where five tiles out of the 25 tiles are shown in the side view (e.g., tiles with pixel groups 344D, 344A, 344B, 344C, and 344E and corresponding lenses 342D, 342A, 342B, 342C, and 342E). As explained above with respect to FIGS. 3E-3G, the respective pattern of light from group 344A of pixels forms an image on a first portion 332A of a retina of eye 325, the respective pattern of light from group 344B of pixels forms an image on a second portion 332B of the retina of eye 325, and the respective pattern of light from group 344C of pixels forms an image on a third portion 332C of the retina of eye 325. However, group 344D of pixels and group 344E of pixels are not activated. In some embodiments, group 344D of pixels and group 344E of pixels are not activated, because light output from group 344D of pixels and group 344E of pixels cannot be directed to pupil 330 of eye 325 (or because the light output from group 344D of pixels and group 344E of pixels cannot form an image on the retina of eye 325). In some embodiments, group 344D of pixels and group 344E of pixels are not activated, because the light output from group 344D of pixels and group 344E of pixels are not necessary for forming an image on the retina of eye 325. In some embodiments, group 344D of pixels and group 344E of pixels are not activated, because light output from group 344D of pixels and group 344E of pixels cannot be directed to pupil 330 of eye 325 (or because the light output from group 344D of pixels and group 344E of pixels cannot form an image on the retina of eye 325). In some embodiments, the first portion 332A, the second portion 332B, and the third portion 332C correspond to a fovea of eye 325 (e.g., the tiles are used for rendering images on the fovea).

In some embodiments, a group of pixels that is not activated does not output light toward the pupil of the eye. In some embodiments, a group of pixels that is not activated does not output light at all. In some embodiments, a group of pixels that is not activated is turned off or remains in a power savings mode, thereby reducing consumption of energy.

FIG. 3H also illustrates that out of the twenty-five tiles, nine contiguous tiles (including tiles 360A, 360B, and 360C) are activated (which are shaded in FIG. 3H) and the remaining sixteen tiles (including tiles 360D and 360E) are not activated (which are not shaded in FIG. 3H).

In some embodiments, as shown in FIG. 3I, one or more lenses (e.g., lens 342A, 342C, 342D, and 342E) are tilted to better direct light toward pupil 330 of eye 325.

Figure 4A:
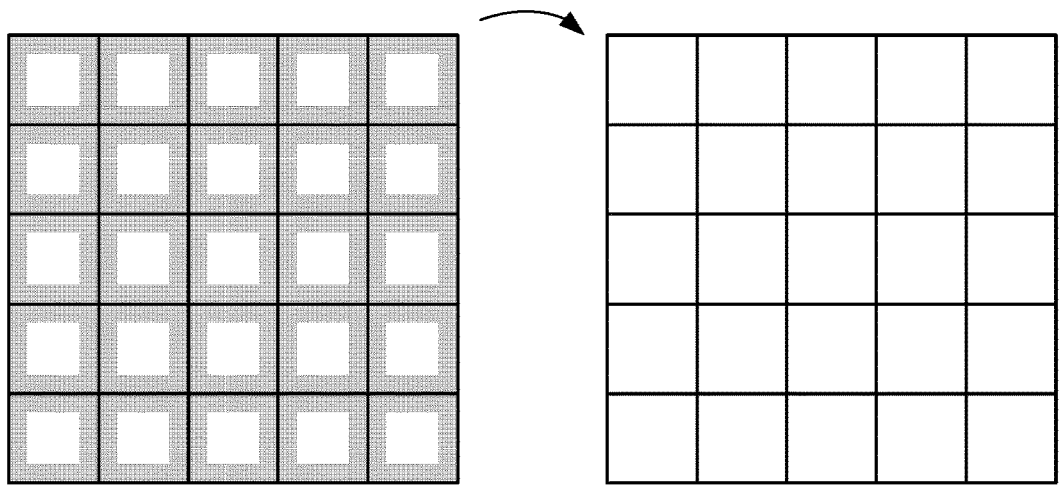
FIGS. 4A and 4B illustrate prophetic examples of correcting brightness variations in accordance with some embodiments.
Figure 4B:
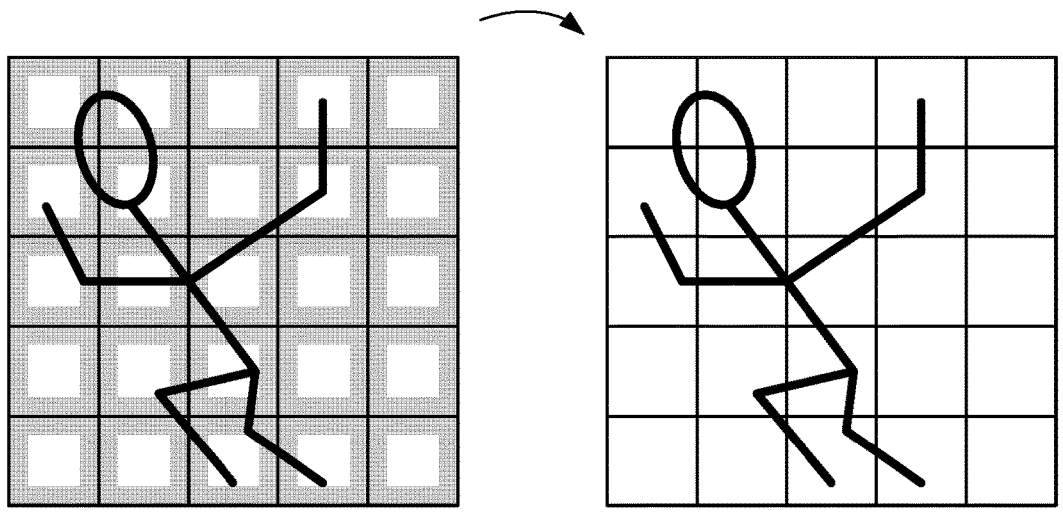

FIGS. 4A and 4B illustrate prophetic examples of correcting brightness variations in accordance with some embodiments.

FIG. 4A illustrates (on the left side) an image projected onto a retina of an eye by a two-dimensional array of tiles (e.g., 5-by-5 array of tiles). As shown in FIG. 4A, in some cases, each portion of the image projected by a single tile has a variation in brightness (e.g., due to the optics). For example, a mono-color image (e.g., an image of a blue sky or a white drywall), when projected onto the retina by the two-dimensional array of tiles, may have a variation in the brightness. To compensate for the variation in the brightness, the image is modified by the one or more processors (e.g., 216 in FIG. 2). For example, if the brightness of pixels along the edges of each tile is higher than the brightness of pixels in the middle of the tile, the brightness of pixels along the edges of the tile is reduced and/or the brightness of pixels in the middle of the tile is increased, thereby providing a corrected distribution of brightness across the tile. Conversely, if the brightness of pixels along the edges of each tile is lower than the brightness of pixels in the middle of the tile, the brightness of pixels along the edges of the tile is increased and/or the brightness of pixels in the middle of the tile is reduced, thereby providing a corrected distribution of brightness across the tile. The right side image in FIG. 4A shows that the image formed on the retina based on the brightness correction has no or reduced brightness variation.

FIG. 4B illustrates another example, in which an image of a person is projected onto the retina of the eye by the two-dimensional array. In the left side image in FIG. 4B, the brightness variation reduces the quality of the image formed on the retina of the eye. The right side image in FIG. 4B shows that correcting the brightness variation improves the quality of the image formed on the retina of the eye.

Certain embodiments based on these principles are described below.

In accordance with some embodiments, display device 100 includes a two-dimensional array of tiles (e.g., two-dimensional array 340 of tiles 360 in FIG. 3B). Each tile (e.g., tile 360 in FIG. 3C) includes a two-dimensional array of pixels (e.g., two-dimensional array 344 of pixels 346 in FIG. 3C) and a lens (e.g., lens 342 in FIG. 3C), of a two-dimensional array of lenses, configured to direct at least a portion of the respective pattern of light from two-dimensional array 344 of pixels to a pupil of an eye of a user (e.g., FIG. 3E). Each pixel is configured to output light so that the two-dimensional array of pixels outputs a respective pattern of light (e.g., two-dimensional array 344A of pixels in FIG. 3G outputs a pattern of light that corresponds to a top portion of a triangle, two-dimensional array 344B of pixels in FIG. 3G outputs a pattern of light that corresponds to a middle portion of the triangle, and two-dimensional array 344C of pixels in FIG. 3G outputs a pattern of light that corresponds to a bottom portion of the triangle). The display device also includes one or more processors (e.g., processors 216 in FIG. 2) coupled with the two-dimensional array of tiles and configured to activate a subset of the two-dimensional array of tiles for outputting, from at least the subset of the two-dimensional array of tiles, a collective pattern of light that is directed to the pupil of the eye of the user (e.g., the subset of the two-dimensional array of tiles is turned on or instructed to output light).

In some embodiments, the display device is a head-mounted display device (e.g., FIG. 1).

In some embodiments, the two-dimensional array of tiles is configured to direct the light from each pixel that outputs light to a pupil of an eye of the user. For example, for any pixel that outputs light, at least a portion of the light output by the pixel is directed to the pupil of the eye of the user. This is distinct from light field displays, in which certain pixels output light that is not directed to the pupil of the eye (e.g., the light is sent to a direction other than a direction toward the pupil of the eye). In some embodiments, tiles that cannot output light that can enter the pupil of the eye of the user (e.g., based on the position of the pupil of the eye) are not activated (e.g., turned off).

In some embodiments, the collective pattern of light is configured to form an image on a retina of the eye of the user (e.g., the image form on the retina of the eye as shown in FIG. 3G).

In some embodiments, a first tile of the two-dimensional array of tiles outputs a first pattern of light; a second tile, adjacent to the first tile, of the two-dimensional array of tiles outputs a second pattern of light; the first pattern of light corresponds to a first portion of the image; the second pattern of light corresponds to a second portion of the image; and the first portion of the image does not overlap at least partially with the second portion of the image. For example, as shown in FIG. 3G, the first tile with group 344A of pixels outputs a pattern of light that corresponds to the top portion of a triangle and the second tile with group 344B of pixels, adjacent to (i.e., next to) the first tile, outputs a pattern of light that corresponds to the middle portion of the triangle. As shown in FIG. 3G, a portion of the image formed by light from group 344A of pixels and a portion of the image formed by light from group 344B of pixels do not overlap. In some embodiments, these portions of the image do not overlap at all (e.g., there is not even a partial overlap between the two portions) for a group of tiles for a same eye. This is distinct from light field displays, which use light output from pixels that are located apart to illuminate a same location on the retina of the eye.

In some embodiments, no two tiles (including two tiles that are adjacent to each other) output patterns of light that correspond to respective portions of the image that at least partially overlap with each other. As explained above, light output from each tile is used to project a unique portion of an image on the retina of the eye. Thus, light output by any two different tiles forms portions of the image that do not overlap with each other at all (e.g., the projected portions of the image do not even partially overlap with each other, as shown in FIG. 3G). However, in some embodiments, a tile configured for projecting a portion of a left-eye image to a left eye and a tile configured for projecting a portion of a right-eye image to a right eye, and the left-eye image and the right-eye image may partially overlap due to the stereoscopic nature of the left-eye image and the right-eye image for providing depth perception.

In some embodiments, no two tiles, that are not adjacent to each other, output patterns of light that correspond to respective portions of the image that at least partially overlap with each other. In such embodiments, the portions of images projected by two adjacent tiles partially overlap (e.g., one or more edges of the portions of the image overlap) to ensure that there is no gap between the projected portions of images.

In some embodiments, the two-dimensional array of tiles is arranged so that a distance between two adjacent pixels in a first tile is distinct from a distance between a first pixel, in the first tile, that is located closest to a second tile that is adjacent to the first tile and a second pixel, in the second tile, that is located closest to the first pixel. For example, as shown in FIG. 3B, a pixel-to-pixel distance within a tile is different from a pixel-to-pixel distance between two adjacent tiles (e.g., due to the portion of tile 360 not covered by the pixels 346, such as an area along a periphery of tile 360).

In some embodiments, the one or more processors are configured to adjust intensity of pixels (e.g., FIGS. 4A and 4B). In some embodiments, the one or more processors are configured to decrease the intensity of pixels along an edge of each tile. In some embodiments, the one or more processors are configured to increase the intensity of pixels at a center of each tile. Alternatively, in some embodiments, the one or more processors are configured to increase the intensity of pixels along an edge of each tile. In some embodiments, the one or more processors are configured to decrease the intensity of pixels at a center of each tile.

In some embodiments, the one or more processors are configured to activate less than all of the tiles of the two-dimensional array of tiles. For example, processors 216 activate only a selection of tiles that can direct light to the pupil of the eye (e.g., FIG. 3H). In comparison, light field displays output light from all of the pixels, which is distinct from the claimed display devices.

In some embodiments, the subset of the two-dimensional array of tiles is a contiguous set of tiles of the two-dimensional array of tiles (e.g., the contiguous set of tiles including tiles 360A, 360B, and 360C in FIG. 3H).

In some embodiments, the two-dimensional array of tiles includes a left-side array of tiles and a right-side array of tiles that does not overlap with the left-side array of tiles. The one or more processors are configured to activate less than all of the tiles of the left-side array of tiles for outputting a first pattern of light that is directed to a pupil of a left eye of the user (e.g., only tiles of the left-side array that can direct light to the pupil of the left eye are activated and the remaining tiles of the left-side array are not activated) and activate less than all of the tiles of the right-side array of tiles for outputting a second pattern of light that is directed to a pupil of a right eye of the user (e.g., only tiles of the right-side array that can direct light to the pupil of the right eye are activated and the remaining tiles of the left-side array are not activated).

Figure 5:
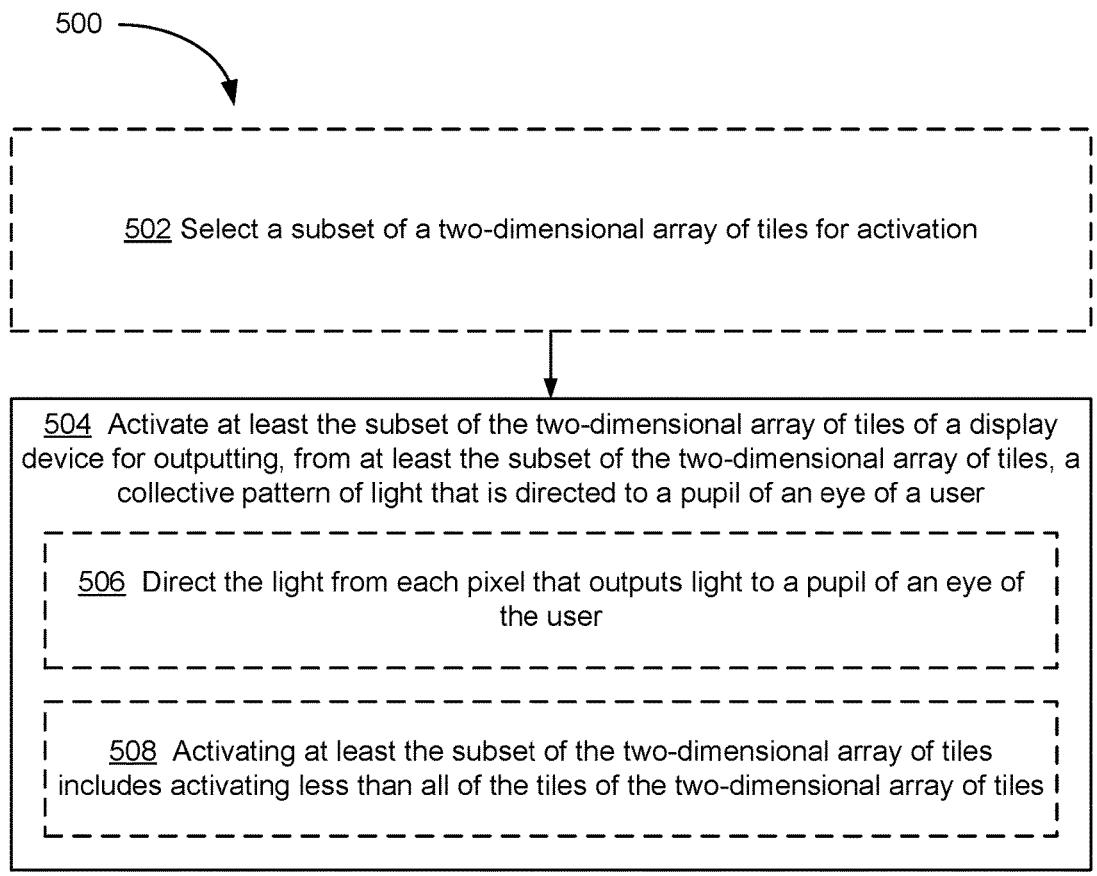
FIG. 5 is a flow diagram illustrating a method of activating a subset of a two-dimensional array of tiles of a display device in accordance with some embodiments.

FIG. 5 is a flow diagram illustrating method 500 of activating a subset of a two-dimensional array of tiles of a display device in accordance with some embodiments. Method 500 is performed at a display device (e.g., display device 100 in FIG. 1) comprising a two-dimensional array of tiles (e.g., FIG. 3B). Each tile includes (e.g., FIG. 3C): a two-dimensional array of pixels (e.g., 344), and a lens (e.g., 342), of a two-dimensional array of lenses, configured to direct at least a portion of the respective pattern of light from the two-dimensional array of pixels to a pupil of an eye of a user (e.g., FIG. 3D). Each pixel is configured to output light so that the two-dimensional array of pixels outputs a respective pattern of light (e.g., FIG. 3G).

In some embodiments, prior to activating at least a subset of a two-dimensional array of tiles, the device selects (502) the subset of the two-dimensional array of tiles for activation. For example, the device determines the subset of the two-dimensional array of tiles based on a position of a pupil of an eye (e.g., the device determines the position of the pupil of the eye, and the device selects the subset of the two-dimensional array of tiles based on the position of the pupil of the eye from a lookup table).

The device activates (504) at least the subset of the two-dimensional array of tiles of the display device for outputting, from at least the subset of the two-dimensional array of tiles, a collective pattern of light that is directed to a pupil of an eye of the user (e.g., FIG. 3G). For example, the device initiates sending power to the subset of the two-dimensional array of tiles. Alternatively, the device sends instructions to the subset of the two-dimensional array of tiles to output light. In some embodiments, the device activates only a subset of the two-dimensional array of tiles for outputting, from the subset of the two-dimensional array of tiles, a collective pattern of light that is directed to a pupil of an eye of the user. In some embodiments, the device deactivates (e.g., turns off or places in a power savings mode) the rest of the two-dimensional array of tiles.

In some embodiments, the device directs (506) the light, from each pixel that outputs light, to a pupil of an eye of the user. For example, light from each pixel that outputs light is directed through a microlens toward the pupil of the eye of the user, as shown in FIG. 3D. In determining whether the device directs the light from each pixel that outputs light to the pupil of the eye, pixels that do not output light are not considered.

In some embodiments, activating at least the subset of the two-dimensional array of tiles includes (508) activating less than all of the tiles of the two-dimensional array of tiles. Activating less than all of the tiles of the two-dimensional array of tiles has an additional advantage in reducing the power consumption, thereby increasing the interval between battery charges.

Figure 6A:
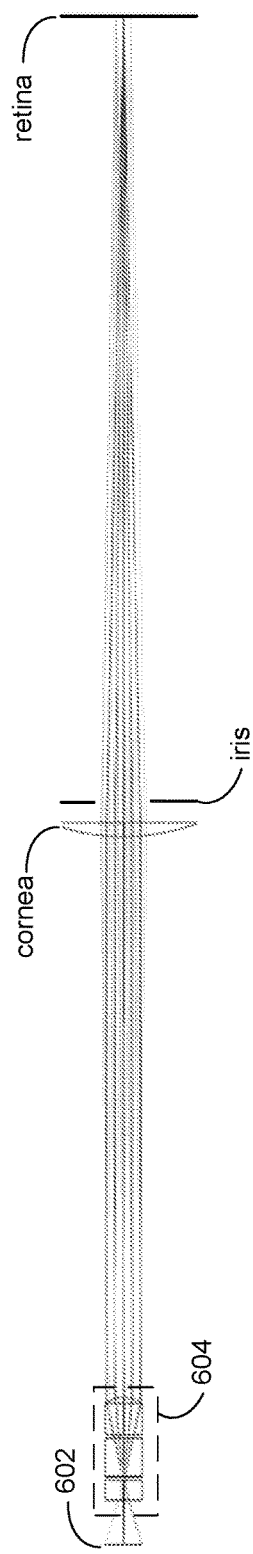
FIG. 6A is a schematic diagram illustrating a lens assembly in accordance with some embodiments.

FIG. 6A is a schematic diagram illustrating lens assembly 604 in accordance with some embodiments. Lens assembly 604 is configured to direct at least a portion of a pattern of light from a two-dimensional array of pixels 602 to a pupil of an eye of a user. For example, lens assembly 604 projects an image on two-dimensional array of pixels 602 onto a retina of the eye of the user. In some embodiments, the image projected on the retina of the eye of the user is a demagnified image of the image on two-dimensional array of pixels 602 (e.g., a size of the image projected on the retina of the eye of the user is smaller than a size of the image on two-dimensional array of pixels 602). This reduces visibility of the spacing between pixels (or sub-pixels) of two-dimensional array of pixels 602, which is often called a screen door effect.

Figure 6B:
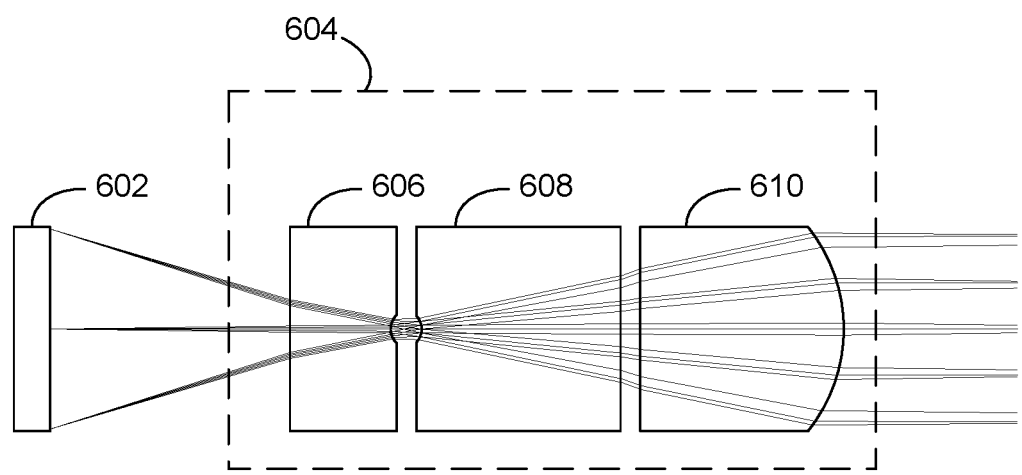
FIG. 6B is a zoomed-in view of the lens assembly shown in FIG. 6A.

FIG. 6B is a zoomed-in view of lens assembly 604 shown in FIG. 6A.

Lens assembly 604 includes multiple distinct optical elements. In some embodiments, lens assembly 604 includes two or more lenses. In some embodiments, lens assembly 604 includes three or more lenses, such as lens 606, lens 608, and lens 610, as shown in FIG. 6B. As shown in FIG. 6B, lens 606 and lens 608 are divergent lenses (e.g., plano-concave lenses) and lens 610 is a convergent lens (e.g., a plano-convex lens). The use of multiple lenses allows large demagnification, such as ¼× demagnification). In some embodiments, curved surfaces of the lenses are aspheric surfaces. This allows a high modulation transfer function.

In some embodiments, lens assembly 604 includes a configuration of an inverted telescope (e.g., an inverted refracting telescope). In some embodiments, lens assembly 604 includes a configuration of an inverse Galileo telescope (e.g., a combination of a divergent lens and a convergent lens), as shown in FIG. 6B. In some embodiments, lens assembly 604 includes a configuration of an inverse Keplerian telescope (e.g., a combination of two or more convergent lenses).

Figure 6C:
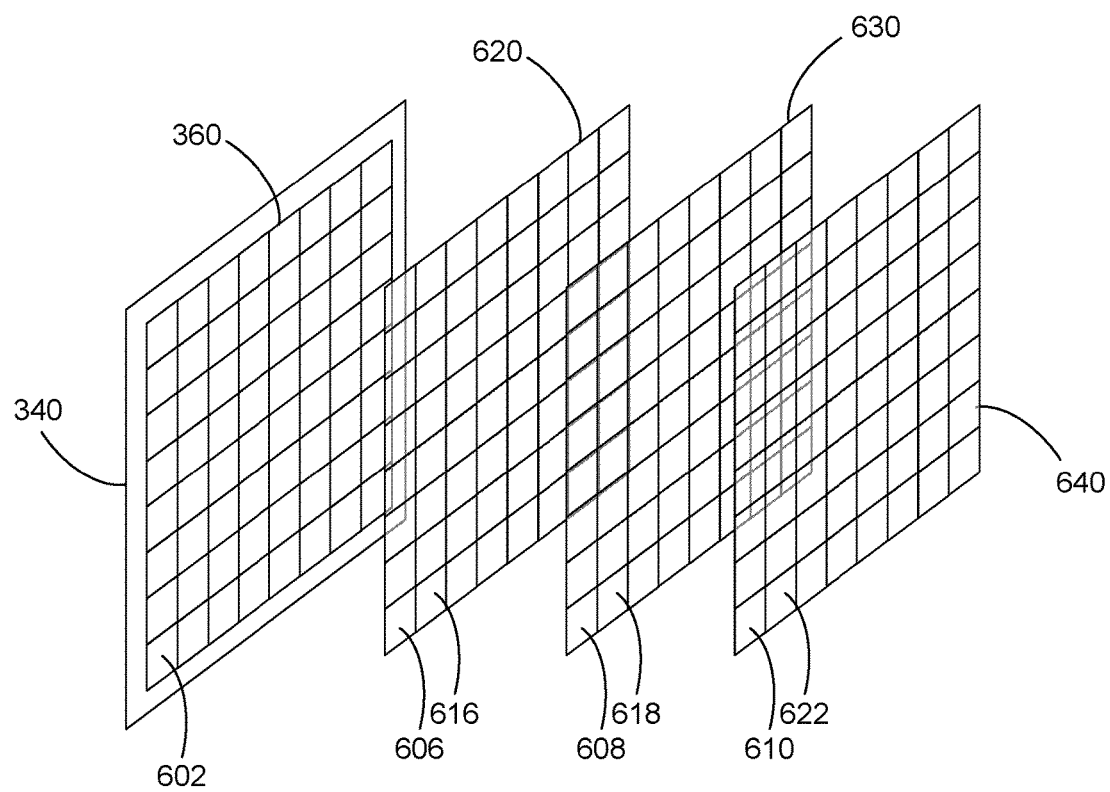
FIG. 6C is a perspective view of a two-dimensional array of tiles in accordance with some embodiments.

Although lenses 606, 608, and 610 are illustrated as single lenses in FIG. 6B, in some embodiments, one or more of lenses 606, 608, and 610 are included in one or more lens arrays. For example, the display device (e.g., 100, FIG. 1) includes three separate lens arrays (e.g., arrays 620, 630, and 640), which collectively form an array of lens assemblies, as shown in FIG. 6C. First array 620 includes a first lens (e.g., lens 606). Second array 630 is distinct and separate from first array 620 and includes a second lens (e.g., lens 608). Third array 640 is distinct and separate from first array 620 and second array 630, and includes a third lens (e.g., lens 610). The first lens, the second lens, and the third lens are included in a same lens assembly of a respective tile.

In some embodiments, a lens assembly includes baffles to reduce cross-talk. For example, one or more baffles reduce transmission of light from two-dimensional array of pixels 602 to lens 616, transmission of light from lens 606 to lens 618, transmission of light from 616 to lens 608, transmission of light from lens 608 to lens 622, and/or transmission of light from lens 618 to lens 610. Additionally or alternatively, in some cases, lenses in a respective array are configured so that a light entering one lens of the respective array is not transmitted to one or more adjacent lenses within the same respective array. For example, transmission of light from lens 606 to adjacent lens 616 (e.g., due to leaking, scattering, etc.) is reduced by a baffle. Similarly, transmission of light from lens 608 to adjacent lens 618 and transmission of light from lens 610 to adjacent lens 622 are reduced by one or more baffles.

In some embodiments, lens 606 and lens 616 are identically configured (e.g., lens 606 and lens 616 have a same focal length). In some embodiments, lens 606 and lens 616 are configured differently (e.g., lens 606 have lens 616 have different focal lengths). In some embodiments, lens 608 and lens 618 are identically configured (e.g., lens 608 and lens 618 have a same focal length). In some embodiments, lens 608 and lens 618 are configured differently (e.g., lens 608 and lens 618 have different focal lengths). In some embodiments, lens 610 and lens 622 are identically configured (e.g., lens 610 and lens 622 have a same focal length). In some embodiments, lens 610 and lens 622 are configured differently (e.g., lens 610 and lens 622 have different focal lengths).

Figure 6D:
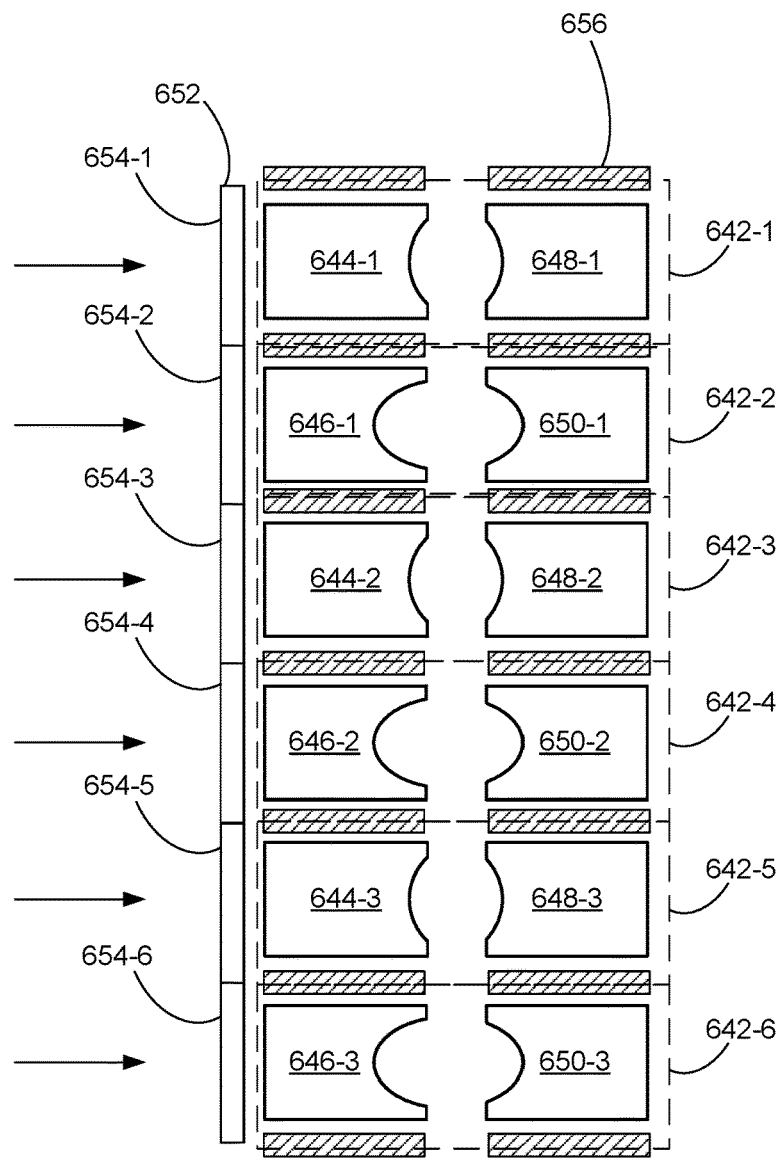
FIG. 6D is a schematic diagram illustrating lens assemblies in accordance with some embodiments.

FIG. 6D is a schematic diagram illustrating a magnification device (e.g., an image magnification or demagnification device) with lens assemblies in accordance with some embodiments. In some embodiments, the magnification device is configured to provide one of predefined magnification factors. In some embodiments, the magnification device is configured to select one of predefined magnification factors.

FIG. 6D illustrates a first group of lens assemblies (e.g., lens assemblies 642-1, 642-3, and 642-5) and a second group of lens assemblies (e.g., lens assemblies 642-2, 642-4, and 642-6). The first group of lens assemblies includes lens assembly 642-1, lens assembly 642-3, and lens assembly 642-5, and the second group of lens assemblies includes lens assembly 642-2, lens assembly 642-4, and lens assembly 642-6. Respective lens assemblies of the first group of lens assemblies are configured to provide a first magnification (e.g., 1×), and respective lens assemblies of the second group of lens assemblies are configured to provide a second magnification (e.g., 0.5×) that is distinct from the first magnification.

As shown in FIG. 6D, each of these lens assemblies includes two or more lenses. For example, lens assembly 642-1 includes lenses 644-1 and 648-1, lens assembly 642-2 includes lenses 646-1 and 650-1, lens assembly 642-3 includes lenses 644-2 and 648-2, lens assembly 642-4 includes lenses 646-2 and 650-2, lens assembly 642-5 includes lenses 644-3 and 648-3, and lens assembly 642-6 includes lenses 646-3 and 650-3.

FIG. 6D also illustrates that the magnification device includes spatial light modulator 652 configured to selectively reduce transmission of light through the two-dimensional array of lens assemblies. For example, spatial light modulator 652 includes a plurality of pixels 654. In some embodiments, the plurality of pixels 654 is aligned with the lens assemblies (e.g., pixel 654-1 is aligned with lens assembly 642-1, pixel 654-2 is aligned with lens assembly 642-2, pixel 654-3 is aligned with lens assembly 642-3, pixel 654-4 is aligned with lens assembly 642-4, pixel 654-5 is aligned with lens assembly 642-5, and pixel 654-6 is aligned with lens assembly 642-6). In some embodiments, each of pixels 654 is configured to selectively transmit or block (or reduce intensity of) light passing through the pixel (e.g., pixel 654-1 is configured to transmit or block light passing through pixel 654-1 based on electrical signal applied to pixel 654-1). For example, in some cases, a pixel (e.g., pixel 654-1) is configured to transmit light independent of whether an adjacent pixel (e.g., pixel 654-2) is configured to transmit light through the adjacent pixel (e.g., pixel 654-2) or block (or reduce intensity of) light. In some embodiments, a pixel is selectively configured to transmit light independent of whether the other pixels are configured to transmit or block (or reduce intensity of) light. In some embodiments, spatial light modulator is configured to concurrently block (or reduce) transmission of light for the first group of lens assemblies and allow transmission of light for the second group of lens assemblies at a first time (e.g., pixels 654-1, 654-3, and 654-5 are configured to block (or reduce) transmission of light for lens assemblies 642-1, 642-3, and 642-5 and pixels 654-2, 654-4, and 654-6 are configured to allow transmission of light for lens assemblies 642-2, 642-4, and 642-6), and concurrently block (or reduce) transmission of light for the second group of lens assemblies and allow transmission of light for the first group of lens assemblies at a second time that is distinct and separate from the first time (e.g., pixels 654-2, 654-4, and 654-6 are configured to block (or reduce) transmission of light for lens assemblies 642-2, 642-4, and 642-6 and pixels 654-1, 654-3, and 654-5 are configured to allow transmission of light for lens assemblies 642-1, 642-3, and 642-5).

In some embodiments, one or more baffles 656 are positioned between adjacent lens assemblies. For example, one or more baffles 656 are positioned between lens assemblies 642-1 and 642-2, one or more baffles 656 are positioned between lens assemblies 642-2 and 642-3, one or more baffles 656 are positioned between lens assemblies 642-3 and 642-4, one or more baffles 656 are positioned between lens assemblies 642-4 and 642-5, and one or more baffles 656 are positioned between lens assemblies 642-5 and 642-6. In some embodiments, the one or more baffles 656 are configured to reduce transmission of light between lens assemblies 642 (e.g., one of more baffles 656 reduce transmission of light between lens assemblies 642-1 and 642-2). In some embodiments, the one or more baffles 656 are configured to reduce transmission of light among microlenses (e.g., one or more baffles 656 reduce transmission of light between lens 644-1 and 646-1 and between lens 644-1 and 650-1).

As shown in FIG. 6D, in some embodiments, a size (e.g., width or diameter) of lens 644 is the same as a size of lens 648. In some embodiments, a size of lens 646 is the same as a size of lens 650. In some embodiments, the size of lens 644 is different from the size of lens 648. In some embodiments, the size of lens 646 is different from the size of lens 650.

Figure 6E:
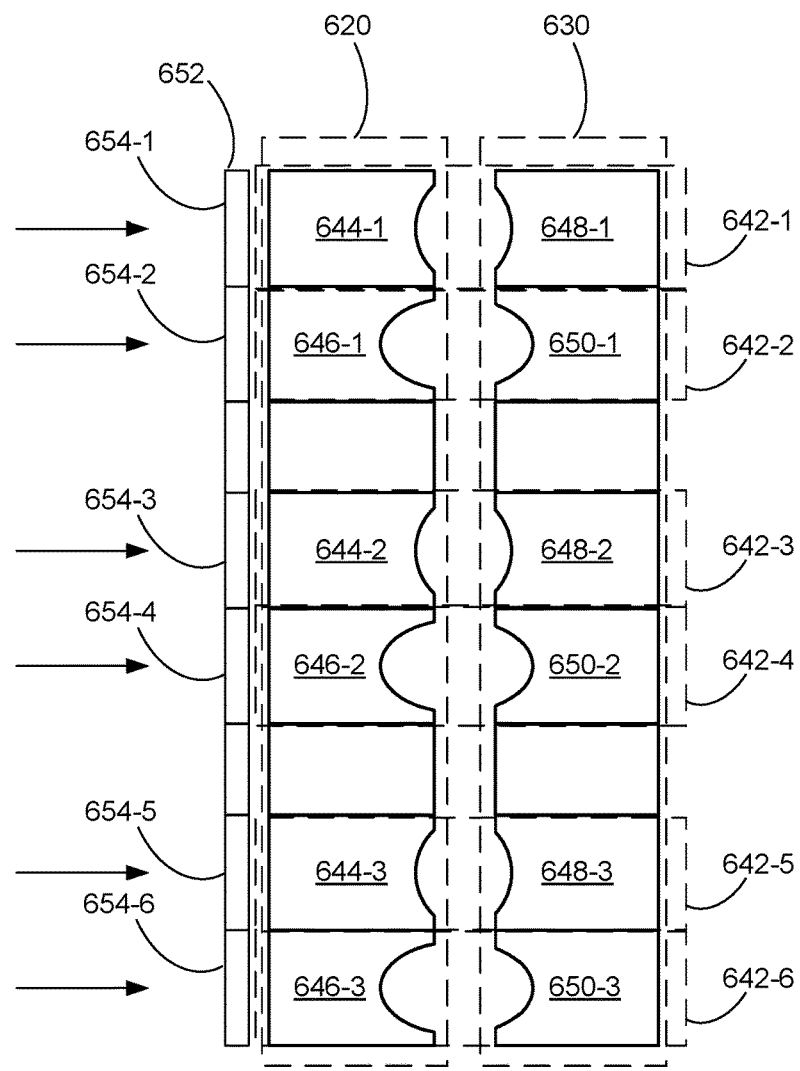
FIG. 6E is a schematic diagram illustrating lens assemblies in accordance with some embodiments.

FIG. 6E is a schematic diagram illustrating a magnification device with lens assemblies in accordance with some embodiments.

FIG. 6E is similar to 6D, except that lenses 644-1, 646-1, 644-2, 646-2, 644-3, and 646-3 are integrated. For example, lenses 644-1, 646-1, 644-2, 646-2, 644-3, and 646-3 are integrally formed (e.g., in a single plastic molding process). As a result, lens array 620 includes lenses 644-1, 646-1, 644-2, 646-2, 644-3, and 646-3. Similarly, in FIG. 6E, lenses 648-1, 650-1, 648-2, 650-2, 648-3, and 650-3 are integrated. For example, lenses 648-1, 650-1, 648-2, 650-2, 648-3, and 650-3 are integrally formed (e.g., in a single plastic molding process). As a result, lens array 630 includes lenses 648-1, 650-1, 648-2, 650-2, 648-3, and 650-3.

Figure 6F:
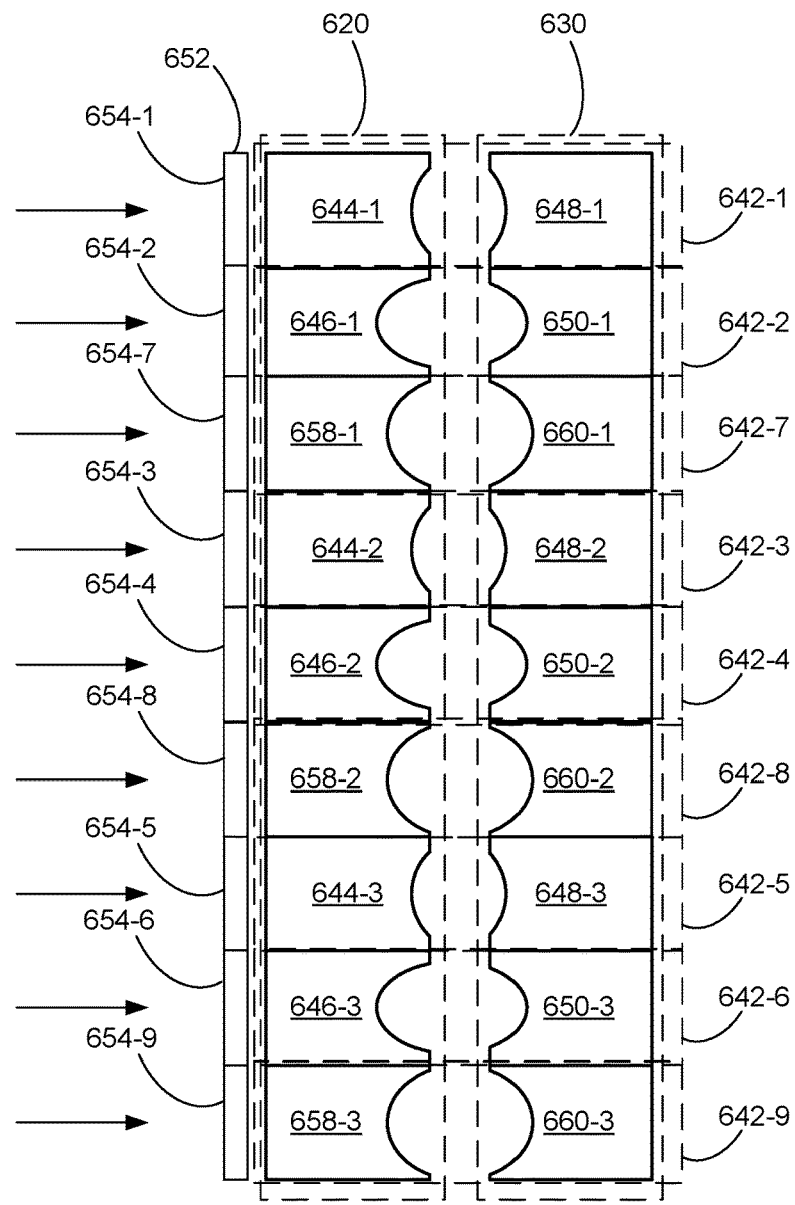
FIG. 6F is a schematic diagram illustrating lens assemblies in accordance with some embodiments.

FIG. 6F is a schematic diagram illustrating a magnification device with lens assemblies in accordance with some embodiments.

FIG. 6F is similar to FIG. 6E, except that the lens assemblies also include a third group of lens assemblies (e.g., lens assemblies 642-7, 642-8, and 642-9).

As shown in FIG. 6F, respective lens assemblies of the third group of lens assemblies include two or more lenses. For example, lens assembly 642-7 includes lenses 658-1 and 660-1, lens assembly 642-8 includes lenses 658-2 and 660-2, lens assembly 642-9 includes lenses 658-3 and 660-3. Respective lens assemblies of the third group of lens assemblies are configured to provide a third magnification (e.g., 0.25×) that is distinct from the first magnification (e.g., 1×) and the second magnification (e.g., 0.5×).

In some embodiments, spatial light modulator is configured to concurrently block (or reduce) transmission of light for the second and third groups of lens assemblies and allow transmission of light for the first group of lens assemblies at a first time (e.g., pixels 654-2, 654-4, 654-6, 654-7, 654-8, and 654-9 are configured to block (or reduce) transmission of light for lens assemblies 642-2, 642-4, 642-6, 642-7, 642-8, and 642-9 and pixels 654-1, 654-3, and 654-5 are configured to allow transmission of light for lens assemblies 642-1, 642-3, and 642-5), concurrently block (or reduce) transmission of light for the first and third groups of lens assemblies and allow transmission of light for the second group of lens assemblies at a second time that is distinct and separate from the first time (e.g., pixels 654-1, 654-3, 654-5, 654-7, 654-8, and 654-9 are configured to block (or reduce) transmission of light for lens assemblies 642-1, 642-3, 642-5, 642-7, 642-8, and 642-9 and pixels 654-2, 654-4, and 654-6 are configured to allow transmission of light for lens assemblies 642-2, 642-4, and 642-6), and concurrently block (or reduce) transmission of light for the first and second groups of lens assemblies and allow transmission of light for the second group of lens assemblies at a third time that is distinct and separate from the first time and the second time (e.g., pixels 654-1, 654-2, 654-3, 654-4, 654-5, and 654-6 are configured to block (or reduce) transmission of light for lens assemblies 642-1, 642-2, 642-3, 642-4, 642-5, and 642-6 and pixels 654-7, 654-8, and 654-9 are configured to allow transmission of light for lens assemblies 642-7, 642-8, and 642-9).

Although FIG. 6F illustrate a magnification device with three groups of lens assemblies, each group configured to provide different magnification, the magnification device may include four or more groups of lens assemblies, each group configured to provide different magnification.

As shown in FIG. 6F, in some embodiments, a size of lens 658 is the same as a size of lens 660. In some embodiments, the size of lens 658 is different from the size of lens 660.

Figure 6G:
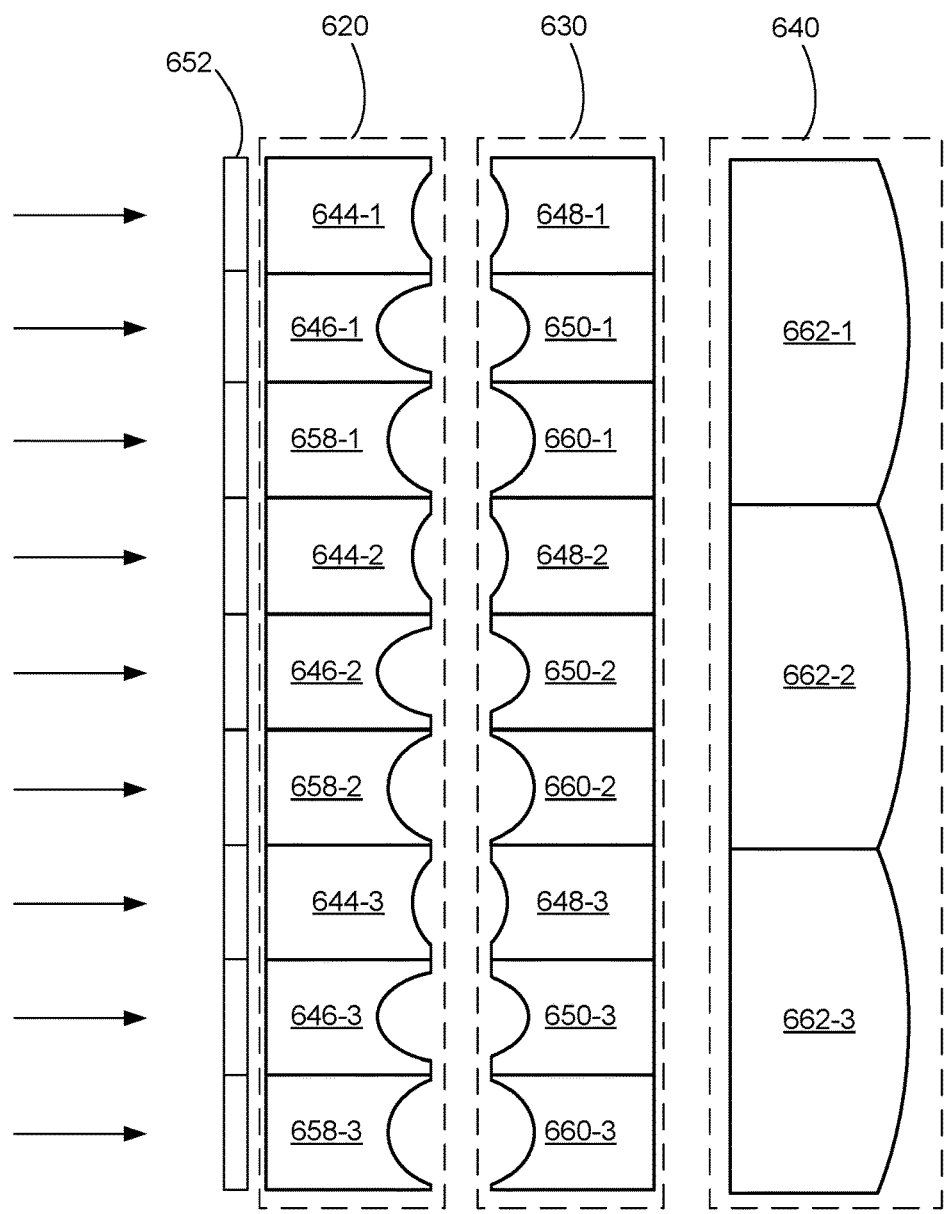
FIG. 6G is a schematic diagram illustrating lens assemblies in accordance with some embodiments.

FIG. 6G is a schematic diagram illustrating a magnification device with lens assemblies in accordance with some embodiments.

FIG. 6G is similar to FIG. 6F except that the lens assemblies also include lens array 640. Lens assembly 640 includes lenses 662-1, 662-2, and 662-3. As shown in FIG. 6G, in some embodiments, a size of lens 662-1 (e.g., width or diameter) is larger than a size of each of lenses 648-1, 650-1, and 660-1.

In some embodiments, lenses 662 are integrated. For example, lenses 662 (e.g., 662-1, 662-2, and 662-3) are integrally formed into single lens array 640.

Figure 6H:
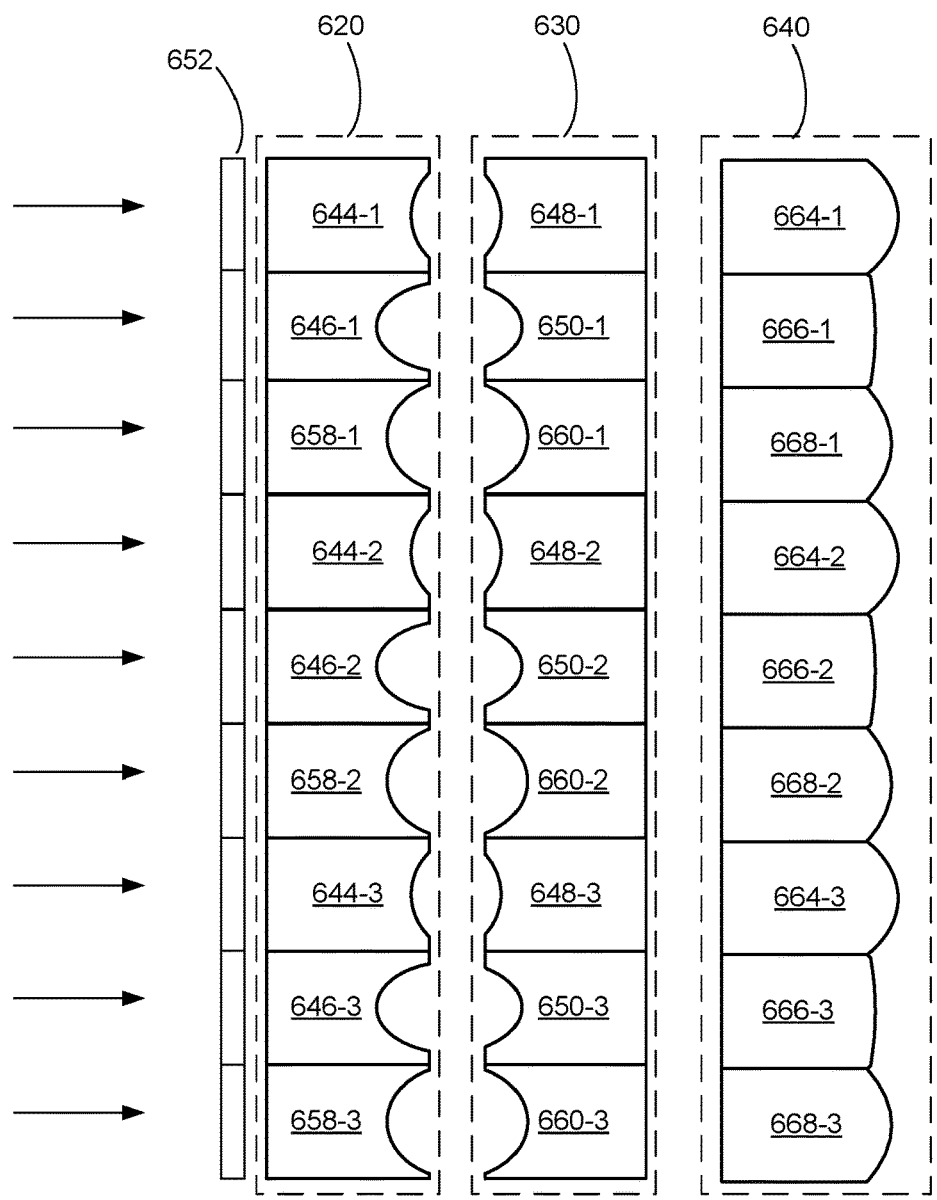
FIG. 6H is a schematic diagram illustrating lens assemblies in accordance with some embodiments.

FIG. 6H is a schematic diagram illustrating a magnification device with lens assemblies in accordance with some embodiments.

FIG. 6H is similar to FIG. 6G except that lens array 640 includes lenses 664-1, 666-1, 668-1, 664-2, 666-2, 668-2, 664-3, 666-3, and 668-3. In some embodiments, a single lens assembly includes a lens of lens array 620 (e.g., lens 644-1), a lens of lens array 630 (e.g., lens 648-1), and a lens of lens array 640 (e.g., lens 664-1).

As shown in FIG. 6H, in some embodiments, a size (e.g., width or diameter) of lens 644 is the same as a size of lens 664. In some embodiments, a size of lens 646 is the same as a size of lens 666. In some embodiments, a size of lens 658 is the same as a size of lens 668. In some embodiments, the size of lens 644 is different from the size of lens 664. In some embodiments, the size of lens 646 is different from the size of lens 666. In some embodiments, the size of lens 658 is different from the size of lens 668.

Figure 6I:
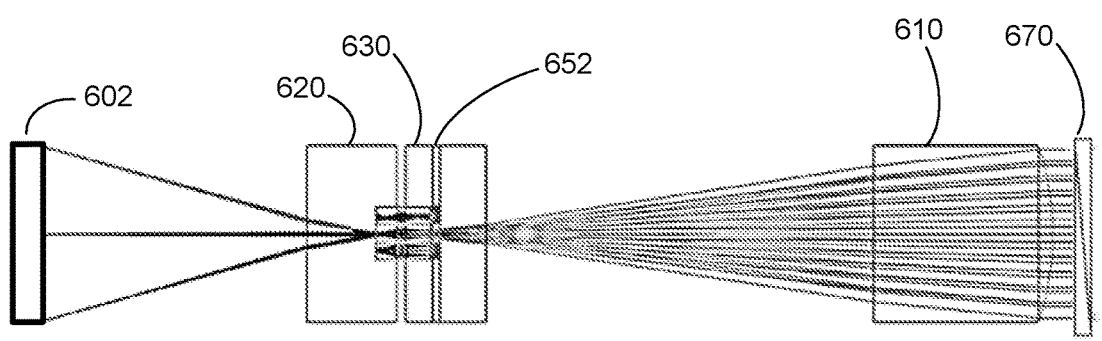
FIG. 6I is a schematic diagram illustrating a display device with lens assemblies in accordance with some embodiments.

Although FIGS. 6D-6I depict spatial light modulator 652 placed adjacent to an entrance of lens assemblies for blocking (or reducing) light transmitted toward the lens assemblies, in some embodiments, spatial light modulator 652 is placed adjacent to an exit of lens assemblies for blocking (or reducing) light emerging from one or more lens assemblies, as shown in FIG. 6I.

FIG. 6I is a schematic diagram illustrating a display device with lens assemblies in accordance with some embodiments.

The display device includes, for each tile, two-dimensional array of pixels 602, lenses of first lens array 620, lenses of second lens array 630, and a lens of third lens array 610. The lenses of first lens array 620, the lenses of second lens array 630, and the lens of third lens array 610 collectively include first, second, and third lens assemblies, each configured to provide a different magnification factor (e.g., magnification, which corresponds to a magnification factor greater than 1×; no magnification, which corresponds to a magnification factor of 1×; and/or demagnification, which corresponds to a magnification factor less than 1×). Thus, by selectively reducing transmission of light entering one or more lens assemblies or emerging from the one or more lens assemblies, one of the lens assemblies is used for transmission of light. In FIG. 6I, spatial light modulator 652 is configured to block or reduce transmission of light for two of the three lens assemblies (e.g., top and bottom lens assemblies) and light is transmitted through the remaining lens assembly (e.g., the middle lens assembly) and projected with magnification associated with the remaining lens assembly. When different magnification is desired, spatial light modulator 652 is configured to allow transmission of light through a different lens assembly that is configured to provide different magnification.

Figure 6J:
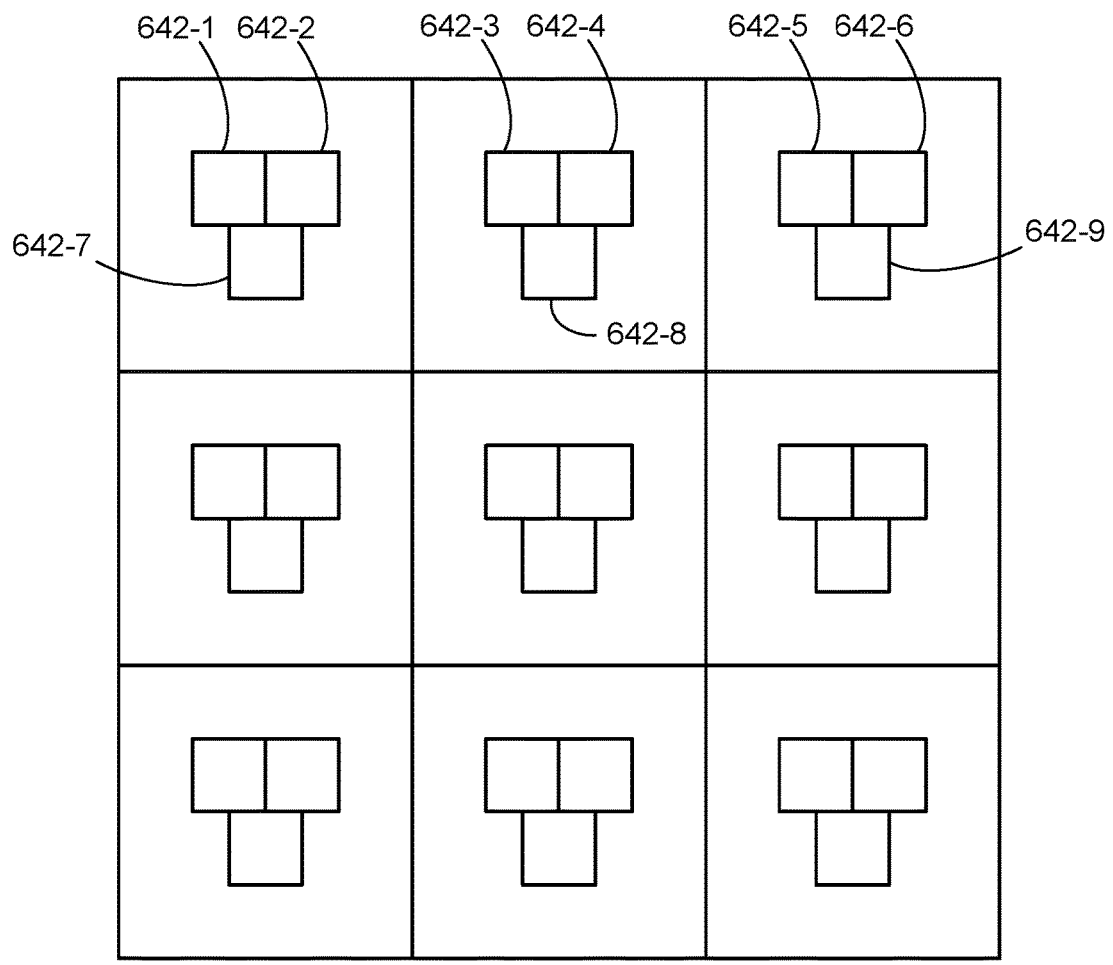
FIG. 6J is a schematic diagram illustrating an elevation view of an array of lens assemblies in accordance with some embodiments.

Although arrangements of lens assemblies in one dimension are depicted in FIGS. 6D-6I, in some embodiments, the lens assemblies are arranged in two dimensions as shown in FIG. 6J. FIG. 6J is a schematic diagram illustrating an elevation view of a two-dimensional array of lens assemblies in accordance with some embodiments. As shown in FIG. 6J, for each tile, a lens assembly of the first group (e.g., lens assembly 642-1), a lens assembly of the second group (e.g., lens assembly 642-2), and a lens assembly of the third group (e.g., lens assembly 642-7) are arranged in two dimensions (e.g., lens assemblies 642-1, 642-2, and 642-7 are not linearly arranged).

Certain embodiments based on these principles are described below. Some of the details described above are not repeated for brevity.

In accordance with some embodiments, a magnification device includes a two-dimensional array of lens assemblies. The two-dimensional array of lens assemblies includes a first group of multiple lens assemblies of a first magnification (e.g., lens assemblies 642-1, 642-3, and 642-5 in FIG. 6E) and a second group of multiple lens assemblies of a second magnification that is distinct from the first magnification (e.g., lens assemblies 642-2, 642-4, and 642-6 in FIG. 6E). The first group of multiple lens assemblies of the first magnification includes a first lens assembly (e.g., lens assembly 642-1), and a second lens assembly (e.g., lens assembly 642-3) that is distinct and separate from the first lens assembly. The second group of multiple lens assemblies of the second magnification includes a third lens assembly (e.g., lens assembly 642-2) that is distinct and separate from the first lens assembly and the second lens assembly; and a fourth lens assembly (e.g., lens assembly 642-4) that is distinct and separate from the first lens assembly, the second lens assembly, and the third lens assembly. Each of the first lens assembly, the second lens assembly, the third lens assembly, and the fourth lens assembly includes two or more lenses (e.g., lens assembly 642-1 includes lens 644-1 and lens 648-1 as shown in FIG. 6E). The device also includes a spatial light modulator configured to selectively reduce (e.g., including blocking) transmission of light for the two-dimensional array of lens assemblies (e.g., spatial light modulator 652 in FIG. 6E).

In some embodiments, the spatial light modulator is configured to concurrently block or reduce transmission of light for the first lens assembly and the second lens assembly or the third lens assembly and the fourth lens assembly. For example, in FIG. 6E, pixels 654-1 and 654-3 (and pixel 654-5) are configured to concurrently block transmission of light while pixels 654-2 and 654-4 (and pixel 654-6) are configured to concurrently allow transmission of light at a first time, pixels 654-2 and 654-4 (and pixel 654-6) are configured to concurrently block transmission of light while pixels 654-1, 654-3, and 654-5 are configured to concurrently allow transmission of light at a second time that is distinct and separate from the first time (e.g., the second time does not overlap with the first time).

In some embodiments, the third lens assembly is located between the first lens assembly and the second lens assembly (e.g., in FIG. 6E, lens assembly 642-2 is located between lens assemblies 642-1 and 642-3); and the second lens assembly is located between the third lens assembly and the fourth lens assembly (e.g., in FIG. 6E, lens assembly 642-3 is located between lens assemblies 642-2 and 642-4).

In some embodiments, the two-dimensional array of lens assemblies also includes a third group of multiple lens assemblies of a third magnification that is distinct from the first magnification and the second magnification (e.g., lens assemblies 642-7, 642-8, and 642-9 in FIG. 6F). The third group of multiple lens assemblies includes a fifth lens assembly (e.g., lens assembly 642-7) that is distinct and separate from the first lens assembly, the second lens assembly, the third lens assembly, and the fourth lens assembly, and a sixth lens assembly (e.g., lens assembly 642-8) that is distinct and separate from the first lens assembly, the second lens assembly, the third lens assembly, the fourth lens assembly, and the fifth lens assembly.

In some embodiments, the fifth lens assembly is located between the third lens assembly and the second lens assembly (e.g., in FIG. 6F, lens assembly 642-7 is located between lens assemblies 642-2 and 642-3); and the second lens assembly and the fourth lens assembly are located between the fifth lens assembly and the sixth lens assembly (e.g., lens assemblies 642-3 and 642-4 are located between lens assemblies 642-7 and 642-8).

In some embodiments, the fifth lens assembly is located between the first lens assembly and the second lens assembly (e.g., in FIG. 6F, lens assembly 642-7 is located between lens assemblies 642-1 and 642-3); and the second lens assembly and the fourth lens assembly are located between the fifth lens assembly and the sixth lens assembly (e.g., lens assemblies 642-3 and 642-4 are located between lens assemblies 642-7 and 642-8).

In some embodiments, each lens assembly includes at least two lenses. For example, in FIG. 6E, each lens assembly includes two lenses (e.g., lens assembly 642-1 includes lenses 644-1 and 648-1).

In some embodiments, each lens assembly includes at least three lenses. For example, in FIG. 6H, a particular lens assembly includes three lenses 644-1, 648-1, and 664-1.

In some embodiments, the device includes a first microlens array (e.g., lens array 620 in FIG. 6E) and a second microlens array (e.g., lens array 630) that is distinct from the first microlens array. Each lens assembly includes at least one microlens of the first microlens array and at least one microlens of the second microlens array (e.g., lens assembly 642-1 includes lens 644-1 of lens array 620 and lens 648-1 of lens array 630).

In some embodiments, the first microlens array includes a plurality of microlenses arranged in multiple dimensions (e.g., lens array 620 includes lenses 644-1, 646-1, 644-2, 646-2, 644-3, and 646-3 and additional lenses in a dimension not depicted in FIG. 6E); the second microlens array includes a plurality of microlenses arranged in multiple dimensions (e.g., lens array 630 includes lenses 648-1, 650-1, 648-2, 650-2, 648-3, and 650-3 and additional lenses in a dimension not depicted in FIG. 6E); and a respective lens of the first microlens array is aligned with a corresponding lens of the second microlens array (e.g., lens 646-1 is aligned with lens 650-1 in FIG. 6E).

In some embodiments, the first microlens array includes a plurality of microlenses of a first focal length (e.g., lenses 644-1, 644-2, and 644-3 in FIG. 6E) and a plurality of microlenses of a second focal length that is distinct from the first focal length (e.g., lenses 646-1, 646-2, and 646-3 in FIG. 6E). The microlenses of the first focal length are interspersed with the microlenses of the second focal length (e.g., lens 646-1 is located between lenses 644-1 and 644-2 and lens 644-2 is located between lenses 646-1 and 646-2).

In some embodiments, the first microlens array also includes a plurality of microlenses of a third focal length that is distinct from the first focal length and the second focal length (e.g., lenses 658-1, 658-2, and 658-3 in FIG. 6F). The microlenses of the third focal length are interspersed with the microlenses of the first focal length and the microlenses of the second focal length (e.g., lens 658-1 is located between lenses 646-1 and 644-2 and lenses 644-2 and 646-2 are located between lenses 658-1 and 658-2).

In some embodiments, the second microlens array includes a plurality of microlenses of a fourth focal length (e.g., lenses 648-1, 648-2, and 648-3 in FIG. 6E) and a plurality of microlenses of a fifth focal length that is distinct from the fourth focal length (e.g., lenses 650-1, 650-2, and 650-3 in FIG. 6E). The microlenses of the fourth focal length are interspersed with the microlenses of the fifth focal length (e.g., lens 650-1 is located between lenses 648-1 and 648-2 and lens 648-2 is located between lenses 650-1 and 650-2).

In some embodiments, the second microlens array also includes a plurality of microlenses of a sixth focal length that is distinct from the fourth focal length and the fifth focal length (e.g., lenses 660-1, 660-2, and 660-3 in FIG. 6F). The microlenses of the sixth focal length are interspersed with the microlenses of the fourth focal length and the microlenses of the fifth focal length (e.g., lens 660-1 is located between lens 650-1 and 648-2 and lenses 648-2 and 650-2 are located between lenses 660-1 and 660-2).

In some embodiments, the device includes a third microlens array (e.g., lens array 640 in FIG. 6G). Each lens assembly also includes at least one microlens of the third microlens array in addition to the at least one microlens of the first lens array and the at least one microlens of the second microlens array (e.g., in FIG. 6G, a first lens assembly includes lenses 644-1, 648-1, and 662-1 and a second lens assembly includes lenses 646-1, 650-1, and 662-1, and in FIG. 6H, a third lens assembly includes lenses 644-1, 648-1, and 664-1 and a fourth lens assembly includes lenses 646-1, 650-1, and 666-1).

In some embodiments, the third microlens array includes a plurality of microlenses arranged in multiple dimensions (e.g., lenses 662-1, 662-2, and 662-3 and additional lenses in a dimension not depicted in FIG. 6G). A respective lens of the third microlens array is aligned with a corresponding lens of the first microlens array (e.g., lens 662-1 is aligned with lens 646-1 in FIG. 6G).

In some embodiments, the third microlens array includes a plurality of microlenses of a seventh focal length (e.g., lenses 664-1, 664-2, and 664-3 in FIG. 6H) and a plurality of microlenses of an eighth focal length that is distinct from the seventh focal length (e.g., lenses 666-1, 666-2, and 666-3). The microlenses of the seventh focal length are interspersed with the microlenses of the eighth focal length (e.g., lens 666-1 is located between lenses 664-1 and 664-2 and lens 664-2 is located between lenses 666-1 and 666-2).

In some embodiments, the third microlens array also includes a plurality of microlenses of a ninth focal length that is distinct from the seventh focal length and the eighth focal length (e.g., lenses 668-1, 668-2, and 668-3 in FIG. 6H). The microlenses of the ninth focal length are interspersed with the microlenses of the seventh focal length and the microlenses of the eighth focal length (e.g., lens 668-1 is located between lenses 666-1 and 664-2 and lenses 664-2 and 666-2 are located between lenses 668-1 and 668-2).

In some embodiments, the device includes one or more baffles configured to reduce transmission of light among microlenses on a respective microlens array (e.g., baffles 656 in FIG. 6D).

In accordance with some embodiments, a display device includes any of the magnification devices (e.g., a device that includes multiple lens assemblies) described above; and a two-dimensional array of tiles. Each tile includes a two-dimensional array of pixels (e.g., two-dimensional array 602 of pixels in FIG. 6I). Each pixel is configured to output light so that the two-dimensional array of pixels outputs a respective pattern of light. Each tile also includes a lens assembly, of the first group of multiple lens assemblies of the two-dimensional array of lens assemblies of the device, configured to provide the first magnification (e.g., a lens assembly that includes lenses 644-1 and 648-1 in FIG. 6H); and a lens assembly, of the second group of multiple lens assemblies of the two-dimensional array of lens assemblies of the device, configured to provide the second magnification (e.g., a lens assembly that includes lenses 646-1 and 650-1 in FIG. 6H).

In some embodiments, each tile of the two-dimensional array of tiles includes a lens assembly, of a third group of multiple lens assemblies of the two-dimensional array of lens assemblies of the device, configured to provide a third magnification that is distinct from the first magnification and the second magnification (e.g., a lens assembly that includes lenses 658-1 and 660-1 in FIG. 6H).

In accordance with some embodiments, a method is performed at a display device comprising a spatial light modulator and a two-dimensional array of tiles. Each tile includes a two-dimensional array of pixels. Each pixel is configured to output light so that the two-dimensional array of pixels outputs a respective pattern of light. Each tile also includes a lens assembly, of a first group of multiple lens assemblies of a two-dimensional array of lens assemblies, configured to provide a first magnification, and a lens assembly, of a second group of multiple lens assemblies of the two-dimensional array of lens assemblies, configured to provide a second magnification that is distinct from the first magnification. The method includes activating the spatial light modulator to reduce transmission of light for the lens assembly of the first group of multiple lens assemblies and allow transmission of light for the lens assembly of the second group of multiple lens assemblies (e.g., in FIG. 6E, switching on pixels 654-1 and 654-3 to block or reduce transmission of light through lens assemblies 642-1 and 642-3 and switching off pixels 654-2 and 654-4 to allow transmission of light through lens assemblies 642-2 and 642-4). The method also includes, subsequent to activating the spatial light modulator to reduce transmission of light for the lens assembly of the first group of multiple lens assemblies and allow transmission of light for the lens assembly of the second group of multiple lens assemblies, activating the spatial light modulator to reduce transmission of light for the lens assembly of the second group of multiple lens assemblies and allow transmission of light for the lens assembly of the first group of multiple lens assemblies (e.g., in FIG. 6E, switching off pixels 654-1 and 654-3 to allow transmission of light through lens assemblies 642-1 and 642-3 and switching on pixels 654-2 and 654-4 to block or reduce transmission of light through lens assemblies 642-2 and 642-4).

Figure 7A:
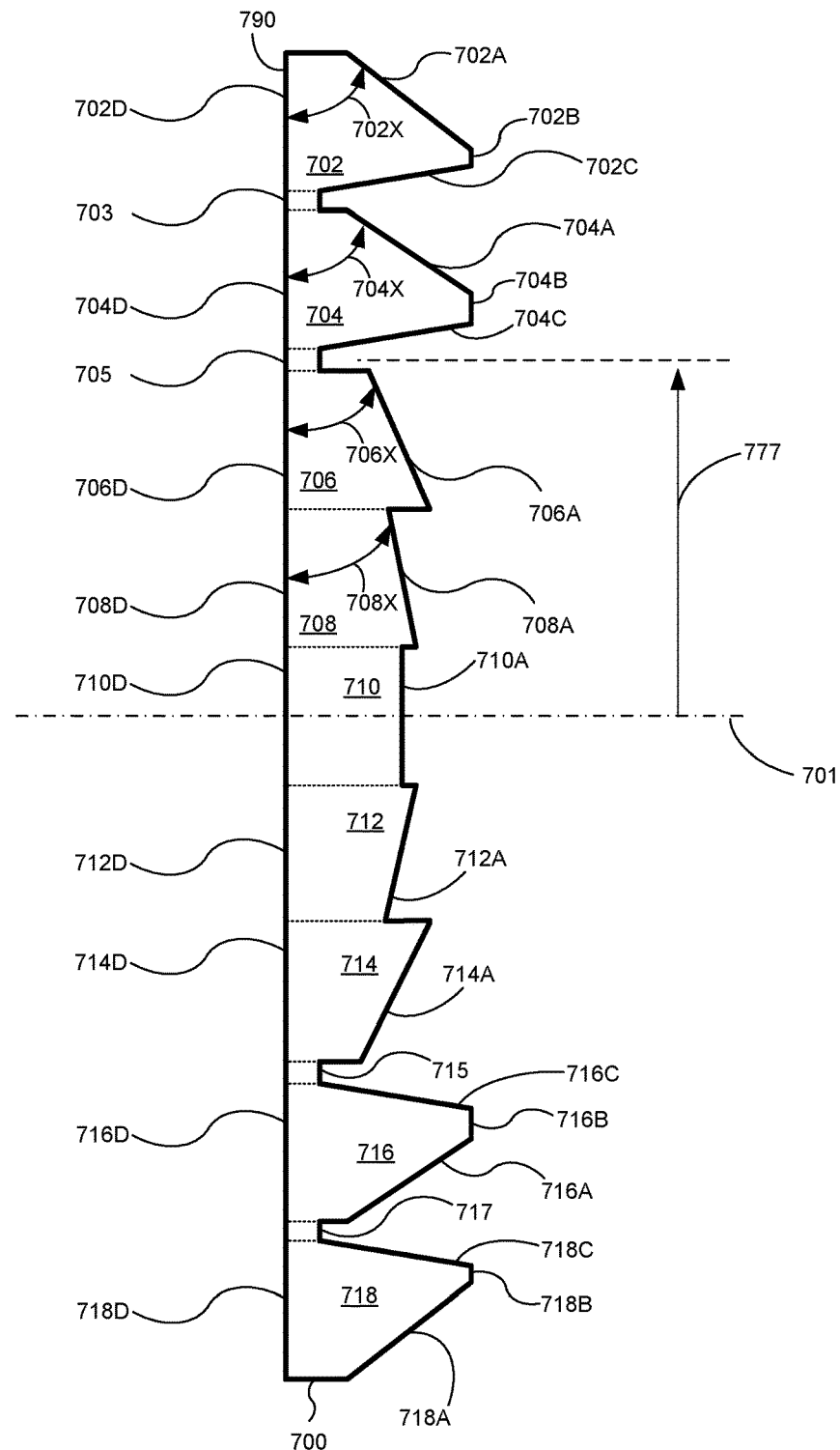
FIG. 7A is a cross-sectional view of a beam deflector device in accordance with some embodiments.

FIG. 7A is a cross-sectional view of a beam deflector device in accordance with some embodiments.

In FIG. 7A, the beam deflector device includes a single integrated substrate 700, which includes a first array of light-steering components (e.g., 706, 708, 712, and 714) and a second array of light-steering components (e.g., 702, 704, 716, and 718).

In some embodiments, some of the light-steering components are prisms. In some embodiments, all of the light-steering components are prisms. However, at least some of the light-steering components need not be prisms. One of ordinary skill will appreciate that light-steering components other than prisms may be used in conjunction with prisms, without departing from the scope of the invention. In some embodiments, some of the light-steering components have a shape of a wedge. In some embodiments, all of the light-steering components have a shape of a wedge.

In some embodiments, a prism refers to an optical element with at least two non-parallel flat optical surfaces (e.g., an entrance surface and an apex surface). As used herein, a flat optical surface refers to a surface that is represented by a straight line in a cross-sectional view (taken from a surface that passes through a center of the prism). For example, a flat optical surface includes a planar surface (e.g., a surface of a cube). In another example, a flat optical surface includes a circumferential surface of a cylinder or a cone, as the circumferential surface is represented by a straight line in a cross-sectional view of the cylinder or the cone. In a prism, the apex surface is a surface that a light entering the prism through the entrance surface at an angle that is perpendicular to the entrance surface reaches immediately subsequent to entering the prism through the entrance surface (e.g., before reaching any other surface of the prism).

In FIG. 7A, the beam deflector device is, for convenience of description, segmented into subsections that correspond to light-steering components, such as prisms 702, 704, 706, 708, 710, 712, 714, 716, and 718 and connecting regions 703, 705, 715, and 717.

The single integrated substrate 700 includes a planar entrance surface 790 and a non-planar exit surface that is opposite to the planar entrance surface 790. In FIG. 7A, the prisms 702, 704, 706, 708, 712, 714, 716, and 718 are located on the non-planar exit surface.

The beam deflector device includes a first array of light-steering components, such as prisms 706, 708, 712, and 714, that are located at respective distances less than a predefined distance 777 from a reference point (or a reference axis 701). For example, the distance between the reference axis 701 and each of prisms 706, 708, 712, and 714 is less than the predefined distance 777. The single integrated substrate 700 also includes a second array of light-steering components, such as prisms 702, 704, 716, and 718, that are located at respective distances greater than the predefined distance 777 from the reference point (or the reference axis 701).

The prism 706, of the first array of light-steering components, has an entrance surface 706D and an apex surface 706A. The prism 706 has an apex angle 706X that is defined by the entrance surface 706D and the apex surface 706A (e.g., an angle formed by the entrance surface 706D and the apex surface 706A corresponds to the apex angle 706X).

Similarly, the prism 708 has an entrance surface 708D and an apex surface 702A. The prism 708 has an apex angle 708X that is defined by the entrance surface 708D and the apex surface 708A. The prism 712 has an entrance surface 712D and an apex surface 702A. The prism 712 has an apex angle that is defined by the entrance surface 712D and the apex surface 712A. The prism 714 has an entrance surface 714D and an apex surface 702A. The prism 714 has an apex angle that is defined by the entrance surface 714D and the apex surface 714A.

The prism 702, of the second array of light-steering components, has an entrance surface 702D, an apex surface 702A, and the exit surface 702C. In FIG. 7A, the prism 702 also includes an optional surface 702B (e.g., in some cases, the prism 702 does not include the surface 702B and the apex surface 702A is in direct contact with the exit surface 702C). The prism 702 has an apex angle 702X that is defined by the entrance surface 702D and the apex surface 702A (e.g., an angle formed by the entrance surface 702D and the apex surface 702A corresponds to the apex angle 702X).

Similarly, the prism 704 has an entrance surface 704D, an apex surface 704A, and the exit surface 704C. The prism 704 optionally includes a surface 704B. The prism 704 has an apex angle 704X that is defined by the entrance surface 704D and the apex surface 704A. The prism 716 has an entrance surface 716D, an apex surface 716A, and the exit surface 716C. The prism 716 optionally includes a surface 716B. The prism 716 has an apex angle that is defined by the entrance surface 716D and the apex surface 716A. The prism 718 has an entrance surface 718D, an apex surface 718A, and the exit surface 718C. The prism 718 optionally includes a surface 718B. The prism 718 has an apex angle that is defined by the entrance surface 718D and the apex surface 718A.

The prisms of the first array of light-steering components (e.g., the prisms 706, 708, 712 and 714) have an apex angle that is less than a critical angle (e.g., the apex angle 706X is less than the critical angle and the apex angle 708X is less than the critical angle). In some embodiments, the critical angle $\theta_c$ corresponds to arcsin(1/n), where n is a refractive index of the prism (e.g., the refractive index of a material of the prism). For example, polymethyl methacrylate (e.g., acrylic glass) has a refractive index of 1.4905 at 589.3 nm, and the critical angle of polymethyl methacrylate is approximately 42 degrees (for a light having a wavelength of 589.3 nm).

The apex angle 708X of the prism 708 is distinct from the apex angle 706X of the prism 706 (e.g., the apex angle 706X of the prism 706 is greater than the apex angle 708X of the prism 708).

The prisms of the second array of light-steering components (e.g., the prisms 702, 704, 716, and 718) have an apex angle that is greater than the critical angle (e.g., the apex angle 702X is greater than the critical angle and the apex angle 704X is greater than the critical angle).

In some embodiments, the apex angle 702X of the prism 702 is distinct from the apex angle 704X of the prism 704 (e.g., the apex angle 702X of the prism 702 is greater than the apex angle 704X of the prism 704).

In some embodiments, an apex angle of a prism of the second array of light-steering components is less than an angle formed by an entrance surface and an exit surface of the prism (e.g., the apex angle 702X of the prism 702 is less than the angle formed by the entrance surface 702D and the exit surface 702C, and the apex angle 704X of the prism 704 is less than the angle formed by the entrance surface 704D and the exit surface 704C).

In some embodiments, the cross-section of the beam deflector device is symmetric (e.g., the prism 712 is a mirror image of the prism 708, the prism 714 is a mirror image of the prism 706, the prism 716 is a mirror image of the prism 704, and the prism 718 is a mirror image of the prism 702).

In some embodiments, the single integrated substrate 700 includes a region 710 that has two parallel flat optical surfaces (e.g., an entrance surface 710D and an exit surface 710A). In some embodiments, the region 710 corresponds to a through hole (e.g., the single integrated substrate 700 has a through hole for the region 710).

In some embodiments, the single integrated substrate 700 includes glass. In some embodiments, the single integrated substrate 700 is made of glass. In some embodiments, the single integrated substrate 700 includes plastic (e.g., polymethyl methacrylate). In some embodiments, the single integrated substrate 700 is made of plastic (e.g., polymethyl methacrylate). In some embodiments, the single integrated substrate 700 is made by molding (e.g., injection molding). In some embodiments, the beam deflector device includes glass. In some embodiments, the beam deflector device is made of glass. In some embodiments, the beam deflector device includes plastic (e.g., polymethyl methacrylate). In some embodiments, the beam deflector device is made of plastic (e.g., polymethyl methacrylate). In some embodiments, the beam deflector device is made by molding (e.g., injection molding).

In some embodiments, the single integrated substrate 700 is optically transparent. In some embodiments, the single integrated substrate 700 is optically transparent to a visible light (e.g., the single integrated substrate 700 is optically transparent for a visible light spectrum, such as from 400 nm to 650 nm). In some embodiments, the beam deflector device is optically transparent. In some embodiments, the beam deflector device is optically transparent to a visible light (e.g., the beam deflector device is optically transparent for a visible light spectrum, such as from 400 nm to 650 nm).

In FIG. 7A, the apex surfaces face away from the reference axis 701. For example, prisms located above the reference axis 701 (e.g., the prisms 702, 704, 706, and 708) have apex surfaces that face up (e.g., the apex surfaces 702A, 704A, 706A, and 708A face up), and prisms located below the reference axis 701 (e.g., the prisms 712, 714, 716, and 718) have apex surfaces that face down (e.g., the apex surfaces 712A, 714A, 716A, and 718A face down).

In some embodiments, connecting regions are located between prisms of the second array of light-steering components. In FIG. 7A, a connecting region 703 is located between the prism 702 and the prism 704, which facilitates a ray exiting from the prism 702 to propagate without hitting the prism 704. Similarly, a connecting region 705 is located between the prism 704 and the prism 706, which facilitates a ray exiting from the prism 704 to propagate without hitting the prism 706, a connecting region 715 is located between the prism 714 and the prism 716, which facilitates a ray exiting from the prism 716 to propagate without hitting the prism 714, and a connecting region 717 is located between the prism 716 and the prism 718, which facilitates a ray exiting from the prism 718 to propagate without hitting the prism 716. In some embodiments, connecting regions are located between all of the prisms of the second array of light-steering components. In some embodiments, connecting regions are located between only certain prisms of the second array of light-steering components. In some embodiments, no connecting regions are located between any two adjacent prisms of the second array of light-steering components. In such embodiments, each prism of the second array of light-steering components is in direct contact with adjacent prisms.

Although FIG. 7A shows a certain number of prisms (e.g., the prisms 706, 708, 712, and 714) in the first array of light-steering components and a certain number of prisms (e.g., the prisms 702, 704, 716, and 718) in the second array of light-steering components, a person having ordinary skill in the art would understand that more or fewer prisms can be used in the first array of light-steering components and/or the second array of light-steering components. In some other embodiments, the first array of light-steering components includes six or more prisms. In some embodiments, the second array of light-steering components includes six or more prisms.

Figure 7B:
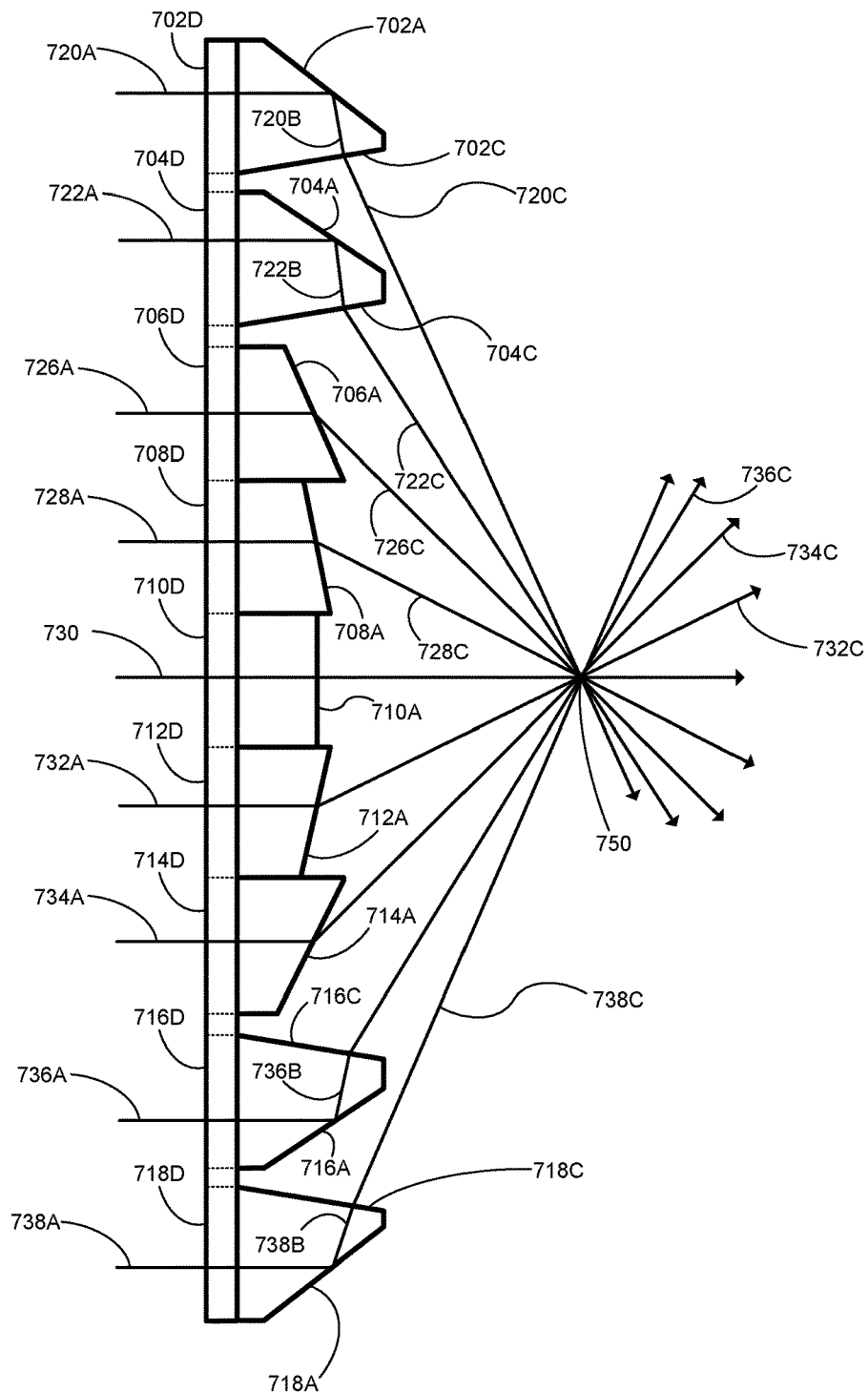
FIG. 7B is an example ray diagram that depicts rays of light passing through the beam deflector device shown in FIG. 7A.

FIG. 7B is an example ray diagram that depicts rays of light passing through the beam deflector device shown in FIG. 7A.

In FIG. 7B, rays enter the beam deflector device at an angle that is perpendicular to the entrance surface of the beam deflector device.

Rays entering the prisms of the first array of light-steering elements through the entrance surfaces exit from the prisms through the apex surfaces. For example, a ray 728A enters the prism 708 through the entrance surface 708D, and exits from the apex surface 708A. The ray 728A impinges on the apex surface 708A at an angle less than the critical angle, and the ray 728A is refracted at the apex surface 708A and is directed in the direction of a ray 728C. Similarly, a ray 726A enters the prism 706 through the entrance surface 706D, and exits from the apex surface 706A. The ray 726A is refracted at the apex surface 706A and is directed in the direction of ray 726C. A ray 732A enters the prism 712 through the entrance surface 712D, and exits from the apex surface 712A. The ray 732A is refracted at the apex surface 712A and is directed in the direction of ray 732C. A ray 734A enters the prism 714 through the entrance surface 714D, and exits from the apex surface 714A. The ray 734A is refracted at the apex surface 714A and is directed in the direction of ray 734C.

Rays entering the prisms of the second array of light-steering elements through the entrance surfaces exist from the prisms through the exit surfaces. For example, a ray 722A enters the prism 704 through the entrance surface 704D. The ray 722A impinges on the apex surface 704A at an angle greater than the critical angle, and the ray 722A is internally reflected by the apex surface 704A (e.g., a total internal reflection) and is directed in the direction of a ray 722B. The ray 722B impinges on the exit surface 704C. The ray 722B impinges on the exist surface 704C at an angle that is less than the critical angle, and the ray 722B is conditionally refracted at the exit surface 704C and is directed in the direction of a ray 722C. Similarly, a ray 720A enters the prism 702 through the entrance surface 702D. The ray 720A impinges on the apex surface 702A at an angle greater than the critical angle, and the ray 720A is internally reflected by the apex surface 702A (e.g., a total internal reflection) and is directed in the direction of a ray 720B. The ray 720B impinges on the exit surface 702C. The ray 720B impinges on the exist surface 702C at an angle that is less than the critical angle, and the ray 720B is conditionally refracted at the exit surface 702C and is directed in the direction of a ray 720C. A ray 736A enters the prism 716 through the entrance surface 716D. The ray 736A impinges on the apex surface 716A at an angle greater than the critical angle, and the ray 736A is internally reflected by the apex surface 716A (e.g., a total internal reflection) and is directed in the direction of a ray 736B. The ray 736B impinges on the exit surface 716C. The ray 736B impinges on the exist surface 716C at an angle that is less than the critical angle, and the ray 736B is conditionally refracted at the exit surface 716C and is directed in the direction of a ray 736C. A ray 738A enters the prism 718 through the entrance surface 718D. The ray 738A impinges on the apex surface 718A at an angle greater than the critical angle, and the ray 738A is internally reflected by the apex surface 718A (e.g., a total internal reflection) and is directed in the direction of a ray 738B. The ray 738B impinges on the exit surface 718C. The ray 738B impinges on the exist surface 718C at an angle that is less than the critical angle, and the ray 738B is conditionally refracted at the exit surface 718C and is directed in the direction of a ray 738C.

In some embodiments, one or more prisms of the second array of light-steering components have exit surfaces arranged perpendicular to rays internally reflected from apex surfaces (e.g., a total internal reflection). For example, the exit surface 704C is perpendicular to the ray 722B so that there is no refraction when the ray 722B exits from the prism 704 through the exit surface 704C. Similarly, in some embodiments, the exit surface 702C is perpendicular to the ray 720B so that there is no refraction when the ray 720B exits from the prism 702 through the exit surface 702C, the exit surface 716C is perpendicular to the ray 736B so that there is no refraction when the ray 716B exits from the prism 736 through the exit surface 736C, and the exit surface 718C is perpendicular to the ray 736B so that there is no refraction when the ray 736B exits from the prism 718 through the exit surface 718C.

In some embodiments, the prisms of the first array of light-steering elements (e.g., the prisms 706, 708, 712, and 714) deflect respective rays (e.g., rays 726, 728, 732, and 734) toward an optical axis of the beam deflector device (e.g., a point 750). In some embodiments, the prisms of the second array of light-steering elements (e.g., the prisms 702, 704, 716, and 718) deflect respective rays (e.g., rays 720, 722, 736, and 738) toward an optical axis of the beam deflector device (e.g., the point 750).

Ray 730 enters region 710 through entrance surface 710D. Ray 730 passes straight through region 710 with little or no deflection.

Figure 7C:
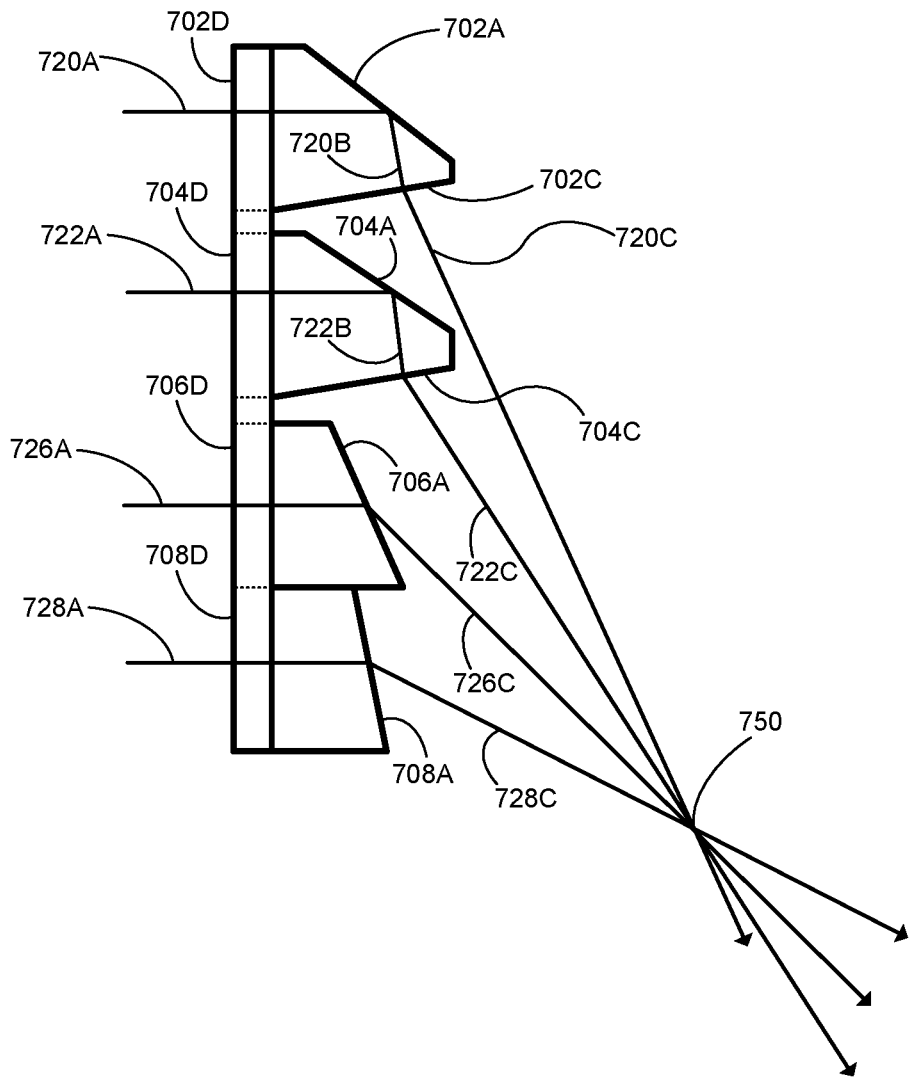
FIG. 7C is a cross-sectional view of a beam deflector device in accordance with some embodiments.

FIG. 7C is a cross-sectional view of a beam deflector device in accordance with some embodiments. The beam deflector device shown in FIG. 7C corresponds to a portion of the beam deflector device shown in FIG. 7A. The structure and operations of each of prisms 702, 704, 706, and 708 have been described previously with respect to FIG. 7A. The transmission of the rays 720, 722, 726, and 728 through respective prisms 702, 704, 706, and 708 has been described above with respect to FIG. 7B. For brevity, these details are not repeated herein.

Figure 7D:
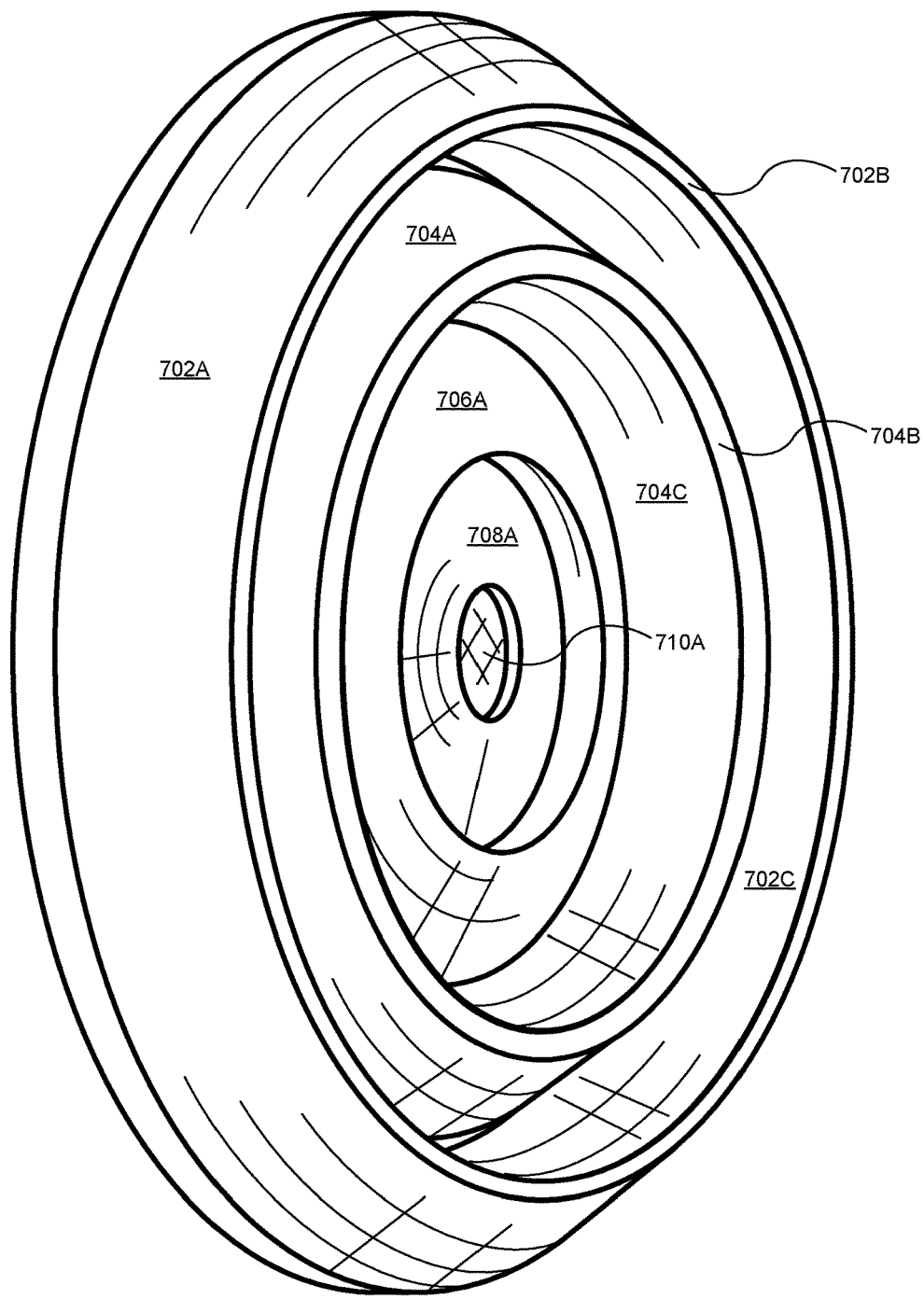
FIG. 7D is a perspective view of a beam deflector device in accordance with some embodiments.

FIG. 7D is a perspective view of a beam deflector device in accordance with some embodiments. The beam deflector device shown in FIG. 7D has a cross-section shown in FIG. 7A. In FIG. 7D, the prisms are annular prisms arranged concentrically. Because the prisms are annular prisms, the prism 702 and the prism 718 (shown in FIG. 7A) are part of a same annular prism (annotated in FIG. 7D as the prism 702), the prism 704 and the prism 716 (shown in FIG. 7A) are part of a same annular prism (annotated in FIG. 7D as the prism 704), the prism 706 and the prism 714 (shown in FIG. 7A) are part of a same annular prism (annotated in FIG. 7D as the prism 706), the prism 708 and the prism 712 (shown in FIG. 7A) are part of a same annular prism (annotated in FIG. 7D as the prism 708).

In some embodiments, each component of the first array of light-steering components is arranged radially from a center of the beam deflector device (e.g., the prism 708 having the apex surface 708A is located close to the center of the beam deflector device, the prism 706 having the apex surface 706A is located outside the prism 708, the prism 704 having the apex surface 704A is located outside the prism 706, and the prism 702 having the apex surface 702A is located outside the prism 704).

Although the beam deflector device is, in some cases, made of a transparent material (e.g., optical glass or plastic), surfaces and lines located behind another optical surface or another optical element (e.g., hidden surfaces and lines) are not shown in FIG. 7D so as not to obscure other aspects shown in FIG. 7D. For example, the entrance surfaces 702D, 704D, 706D, 708D, and 710D are not depicted in FIG. 7D.

Figure 7E:
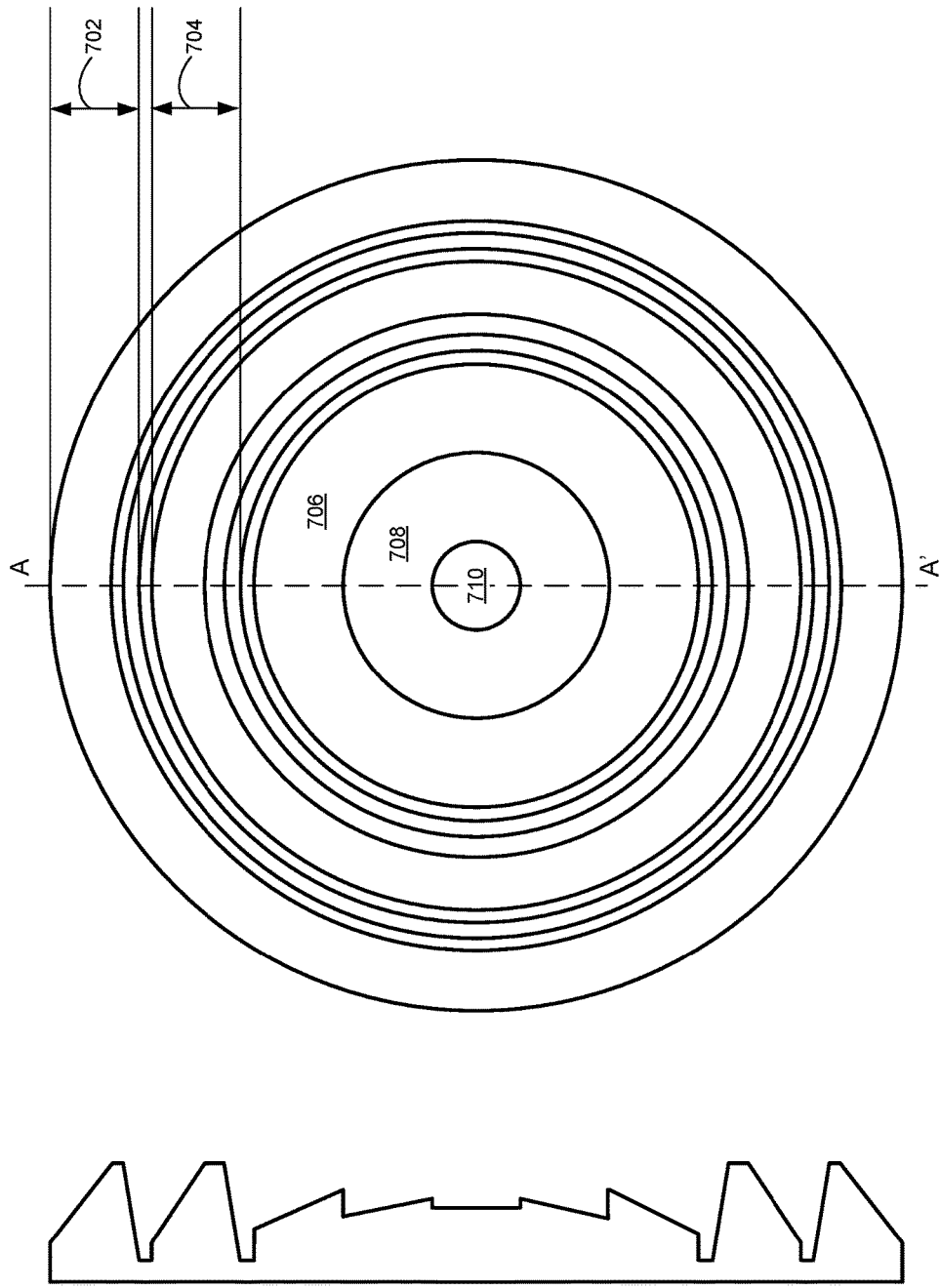
FIG. 7E is a front elevational view of the beam deflector device shown in FIG. 7D.

FIG. 7E is a front elevational view of the beam deflector device shown in FIG. 7D. FIG. 7E also includes the cross-sectional view shown in FIG. 7A to facilitate the understanding of the front elevational view. The cross-sectional view is taken from a surface represented by line AA' (a line that passes through a center of the beam deflector device).

Figure 7F:
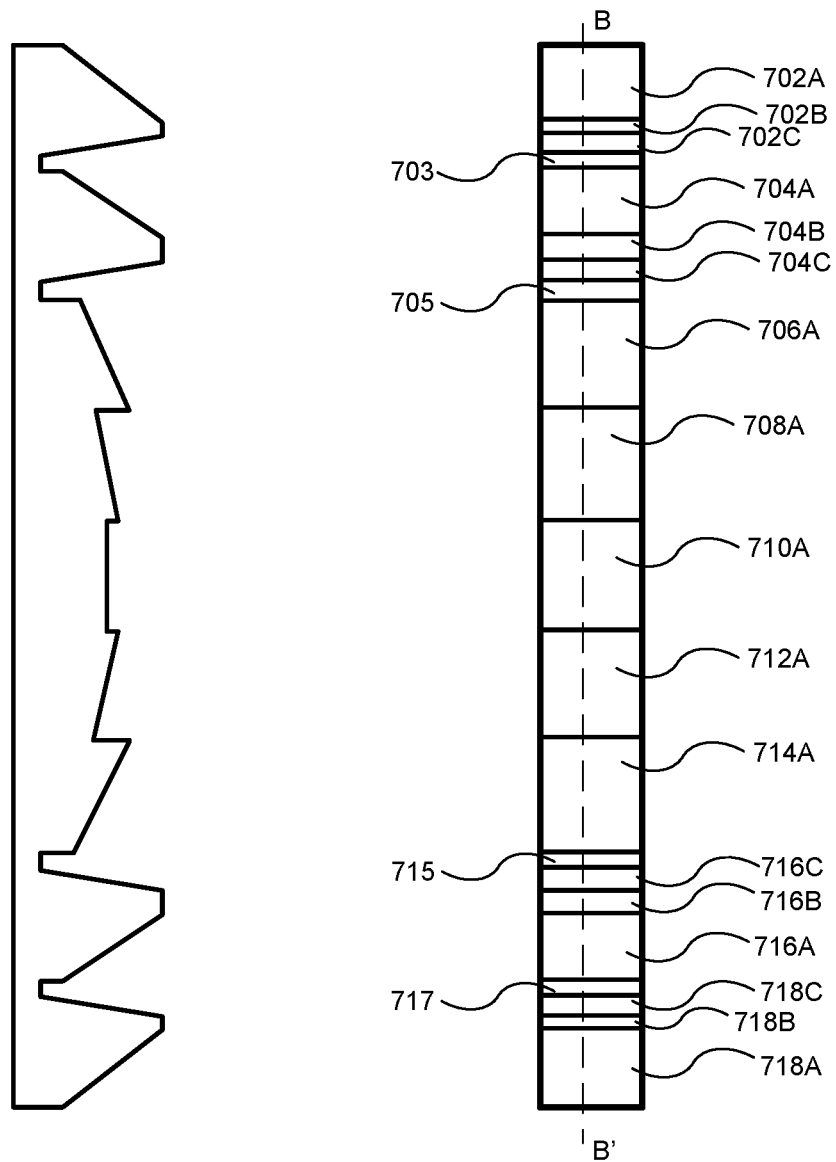
FIG. 7F is a front elevational view of a beam deflector device in accordance with some embodiments.

FIG. 7F is a frontal elevation view of a beam deflector device in accordance with some embodiments. FIG. 7F also includes the cross-sectional view shown in FIG. 7A to facilitate the understanding of the front elevational view. The cross-sectional view is taken from a surface represented by line BB'. The left side view of the beam deflector device is identical to the cross-sectional view. The right side view of the beam deflector device is a mirror image of the left side view.

Figure 7G:
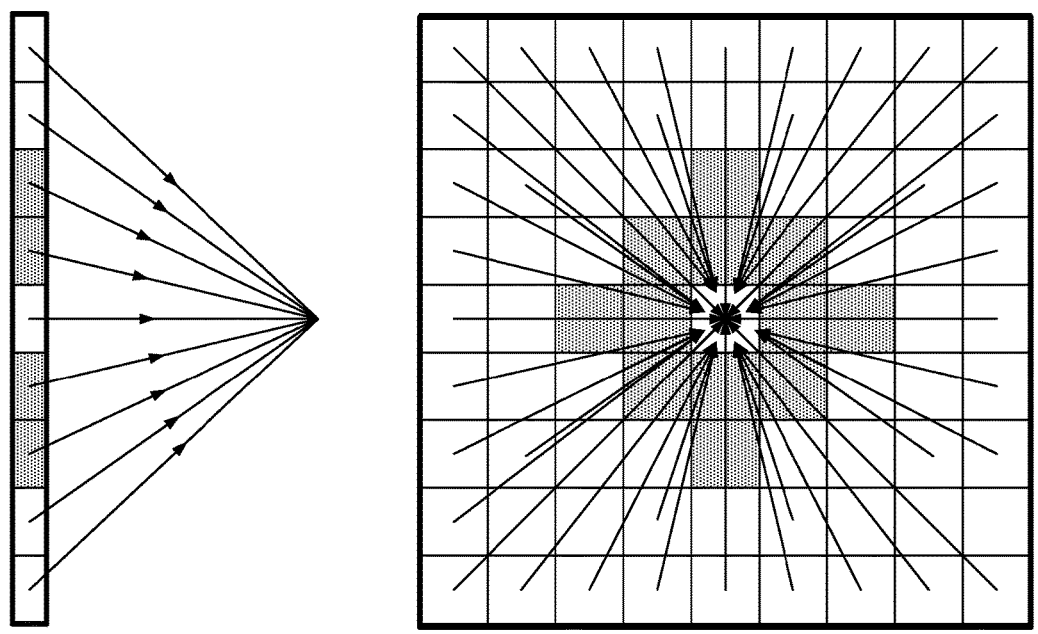
FIG. 7G is a schematic diagram of a beam deflector device in accordance with some embodiments.

FIG. 7G is a schematic diagram of a beam deflector device in accordance with some embodiments. The beam deflector device shown in FIG. 7G has a rectangular array of prisms (e.g., a square array of prisms, such as a 9×9 array of prisms). The rectangular array of prisms is configured to steer light entering through the rectangular array of prisms toward a common focal point. A side view of the beam deflector device shown on the left side of FIG. 7G also illustrates that the prisms of the beam deflector device steer light toward a common focal point (although the light steering components are shown as flat elements in the side view, the light steering components have a wedge shape, as shown in FIG. 7A). The first array of light-steering components (e.g., the shaded light-steering components) have an apex angle that is less than the critical angle and the second array of light-steering components (e.g., the light-steering components located outside the first array of light-steering components) have an apex angle that is greater than the critical angle, as described above with respect to FIGS. 7A and 7B.

Figure 7H:
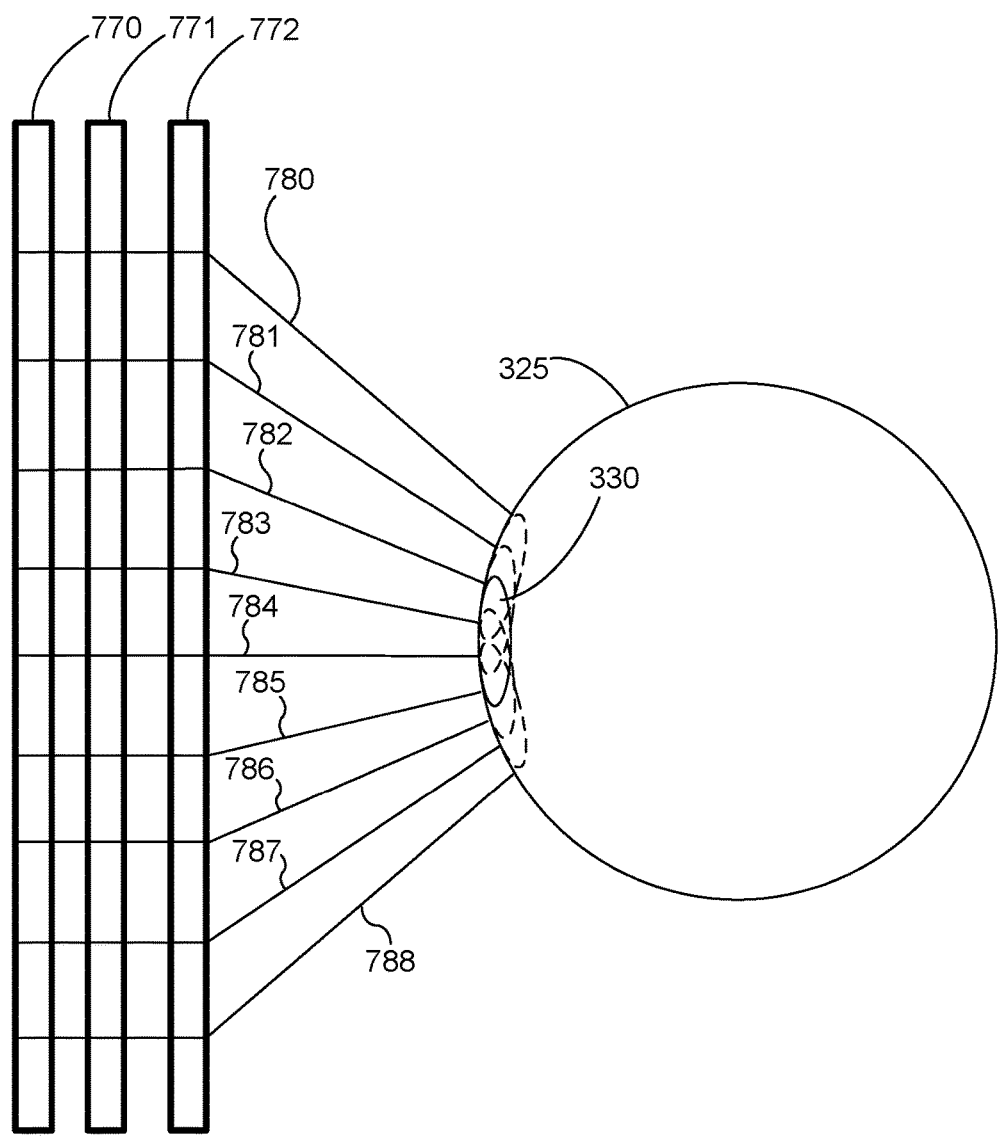
FIG. 7H is a schematic diagram of a display device with a beam deflector device in accordance with some embodiments.

FIG. 7H is a schematic diagram of a display device with a beam deflector device in accordance with some embodiments. In some embodiments, light is generated by a two-dimensional array of pixels 770 (e.g., liquid crystal display elements). In some embodiments, the two-dimensional array of pixels 770 is a liquid-crystal display (LCD). In some embodiments, the two-dimensional array of pixels 770 includes organic light-emitting diodes (OLEDs). In this figure, the light from the two-dimensional array of pixels 770 is illustrated by rays 780, 781, 782, 783, 784, 785, 786, 787, and 788. In some embodiments, the rays from the two-dimensional array of pixels 770 pass through a two-dimensional array of lenses 771. In some embodiments, there may be more than one two-dimension array of lenses in the path of the rays. In some embodiments, the two-dimensional array of lenses 771 is omitted from the display device.

The light passes through a beam deflector device 772, which corresponds to any of the beam deflector devices described herein (e.g., the beam deflector device shown in FIGS. 7A-7F or their variants). Ray 784 is at the center of the two-dimensional array and passes straight through without deflection into the pupil 330 of the eye 325. Rays 782, 783, 785, and 786 (e.g., rays that require a small deflection) are deflected by the prisms in the first array of light-steering components of the beam deflector device 772. Rays 780, 781, 787, and 788 (e.g., rays that requires a large deflection) are deflected by the prisms in the second array of light-steering components of the beam deflector device 772.

By directing light from a large display screen to toward the eye 325, the display device can deliver light through the pupil 330 of the eye 325 regardless of whether the user is looking up, down, left, right, or straight. Accordingly, the display device with the beam deflector device can provide a more immersive virtual reality and/or augmented reality environment, which improves the viewing experience.

In some embodiments, the two-dimensional array of pixels 770 and the beam deflector device 772 are all contained within the head-mounted display device 100 (FIG. 1). In some embodiments, the head-mounted display device 100 also includes the two-dimensional array of lenses 771. In some embodiments, the head-mounted display device 100 also includes a dynamic beam steering device (e.g., an electro-optic beam steering device, such as a dynamic liquid crystal beam steerer).

In light of these principles, we turn to certain embodiments.

In accordance with some embodiments, a beam deflector device includes a single integrated substrate (e.g., the single integrated substrate 700 in FIG. 7A) that has a planar entrance surface (e.g., the entrance surface 790) and a non-planar exit surface (e.g., the surface that is opposite to the entrance surface). The single integrated substrate includes, on the non-planar exit surface, a first array of light-steering components (e.g., the prisms 706, 708, 712, and 714). A respective component of the first array of light-steering components is located at a respective distance less than a predefined distance (e.g., the predefined distance 777) from a reference point (e.g., a reference axis 701). The respective component of the first array of light-steering components includes an optical prism having an apex angle that is less than a critical angle (e.g., the prisms 706, 708, 712, and 714). The first array of light-steering components includes a first prism (e.g., the prism 708) having a first apex angle and a second prism having a second apex angle that is distinct from the first apex angle (e.g., the prism 706). The single integrated substrate also includes, on the non-planar exit surface, a second array of light-steering components (e.g., the prisms 702, 704, 716, and 718). A respective component of the second array of light-steering components is located at a respective distance greater than the predefined distance from the reference point. The respective component of the second array of light-steering components includes an optical prism having an apex angle that is greater than the critical angle.

In some embodiments, the second array of light-steering components includes a third prism (e.g., the prism 702) and a fourth prism (e.g., the prism 704). The third prism has a third apex angle that is distinct from the first apex angle and the second apex angle, and the fourth prism has a fourth apex angle that is distinct from the first apex angle, the second apex angle, and the third apex angle.

In some embodiments, the first prism, the second prism, the third prism, and the fourth prism are configured to steer at least a portion of light passing through the planar entrance surface (e.g., rays that enter through the planar entrance surface at an angle that is perpendicular to the planar entrance surface) toward a common focal point of the beam deflector device (e.g., the point 750 in FIG. 7B).

In some embodiments, the first array of light-steering components and the second array of light-steering components are configured to steer a portion of light passing through the planar entrance surface toward a common focal point of the beam deflector device. For example, in some cases, the apex angle of each component of the first array of light-steering components and the second array of light-steering components (e.g., each prism of the first array of light-steering components and the second array of light-steering components) is selected to steer a portion of light entering the respective component toward a common focal point of the beam deflector device.

In some embodiments, the beam deflector device is configured to focus collimated light entering the beam deflector device through the planar entrance surface toward a common focal point of the beam deflector device (e.g., FIG. 7B).

In some embodiments, each component of the first array of light-steering components has an apex angle that is different from an apex angle of any other component of the first array of light-steering components (e.g., the apex angle 706X of the prism 706 is distinct from the apex angle 708X of the prism 708), and each component of the second array of light-steering components has an apex angle that is different from an apex angle of any other component of the second array of light-steering components (e.g., the apex angle 702X of the prism 702 is distinct from the apex angle 704X of the prism 704).

In some embodiments, the apex angle of the respective component of the first array of light-steering components is defined by the planar entrance surface and an apex surface that is distinct from the planar entrance surface (e.g., the apex angle 708X of the prism 708 is defined by the planar entrance surface 708D and the apex surface 708A of the prism 708). The respective component of the first array of light-steering components is configured to allow light entering the respective component through the planar entrance surface to exit from the respective component through the apex surface (e.g., in FIG. 7B, the light entering the prism 708 exits from the prism 708 through the apex surface 708A). The apex angle of the respective component of the second array of light-steering components is defined by the planar entrance surface and an apex surface that is distinct from the planar entrance surface (e.g., the apex angle 704X of the prism 704 is defined by the planar entrance surface 704D and the apex surface 704A of the prism 704). The respective component of the second array of light-steering components is configured to allow light entering the respective component through the planar entrance surface to internally reflect from the apex surface of the respective component (e.g., the apex angle 704X is greater than the critical angle so that the light entering the prism 704 at an angle that is perpendicular to the entrance surface 704D is reflected from the apex surface 704A by a total internal reflection).

In some embodiments, the apex surface is a planar surface (e.g., FIG. 7F). In some embodiments, the apex surface is a planar circumferential surface (e.g., FIG. 7D).

In some embodiments, the respective component of the second array of light-steering components has an exit surface that is distinct from the planar entrance surface and the apex surface (e.g., the exit surface 704C of the prism 704). The respective component of the second array of light-steering components is configured to allow light entering the respective component through the planar entrance surface to exit, after total internal reflection from the apex surface of the respective component, from the respective component through the exit surface (e.g., light entering the prism 704 exits from the prism 704 through the exit surface 704C).

In some embodiments, the apex angle of each component of the first array of light-steering components is selected to steer a portion of light entering the respective component of the first array of light-steering components toward a common focal point of the beam deflector device (e.g., the deflection angle for a prism of the first array of light-steering components is determined based on the apex angle of the prism); and an exit surface angle, defined by the exit surface and the apex surface, and the apex angle of each component of the second array of light-steering components are selected to steer a portion of light entering the respective component of the second array of light-steering components toward the common focal point of the beam deflector device (e.g., the deflection angle for a prism of the second array of light-steering components is determined based on both the apex angle and the exit surface angle of the prism).

In some embodiments, each component of the first array of light-steering components is arranged radially from the reference point and each component of the second array of light-steering components is arranged radially from the reference point (e.g., FIG. 7D).

In some embodiments, each component of the first array of light-steering components is an annular prism and each component of the second array of light-steering components is an annular prism (e.g., FIG. 7D).

In some embodiments, the first array of light-steering components and the second array of light-steering components are arranged linearly from the reference point (e.g., FIG. 7C).

In some embodiments, the first array of light-steering components and the second array of light-steering components are arranged linearly in two opposing directions from the reference point so that the reference point is located between a prism of the first array of light-steering components and a corresponding prism of the first array of light-steering components and between a prism of the second array of light-steering components and a corresponding prism of the second array of light-steering components (e.g., FIG. 7F).

In accordance with some embodiments, a display device includes a two-dimensional array of pixels (e.g., the two-dimensional array of pixels 770, FIG. 7H). Each pixel is configured to output light so that the two-dimensional array of pixels outputs a respective pattern of light. The display device also includes any beam deflector device described herein. The beam deflector device is configured to transmit the respective pattern of light from the two-dimensional array of pixels (e.g., toward an eye).

In some embodiments, the display device is a head-mounted display device.

In some embodiments, the display device includes a two-dimensional array of lenses (e.g., the two-dimensional array of lenses 771) located between the two-dimensional array of pixels and the beam deflector device.

In some embodiments, the two-dimensional array of lenses is configured to collimate light from the two-dimensional array of pixels. This facilitates transmission of collimated light toward the beam deflector device 772.

In some embodiments, the two-dimensional array of lenses includes a two-dimensional array of lens assemblies. The two-dimensional array of lens assemblies includes a first group of multiple lens assemblies of a first magnification and a second group of multiple lens assemblies of a second magnification that is distinct from the first magnification. The first group of multiple lens assemblies of the first magnification includes a first lens assembly and a second lens assembly that is distinct and separate from the first lens assembly. The second group of multiple lens assemblies of the second magnification includes a third lens assembly that is distinct and separate from the first lens assembly and the second lens assembly; and a fourth lens assembly that is distinct and separate from the first lens assembly, the second lens assembly, and the third lens assembly. Each of the first lens assembly, the second lens assembly, the third lens assembly, and the fourth lens assembly includes two or more lenses. The two-dimensional array of lenses also includes a spatial light modulator configured to selectively reduce transmission of light for the two-dimensional array of lens assemblies. The two-dimensional array of lenses is described above with respect to FIGS. 6A-6J. For brevity, the description is not repeated herein.

In accordance with some embodiments, a method includes outputting a respective pattern of light from a two-dimensional array of pixels; and transmitting the respective pattern of light through any beam deflector device described herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

For example, although the head-mounted displays are described to include a two-dimensional array of tiles, magnification devices described herein can also be used in head-mounted displays that do not include two-dimensional arrays of tiles (e.g., a head-mounted display that includes only one or two non-tiled displays).

In another example, a beam deflector device includes a single integrated substrate that has a first surface and a second surface that is opposite to the first surface. The single integrated substrate includes, on one of the first surface and the second surface, a first array of light-steering components, a respective component of the first array of light-steering components located at a respective distance less than a predefined distance from a reference point and the respective component of the first array of light-steering components comprising an optical prism having an apex angle that is less than a critical angle. The first array of light-steering components includes a first prism having a first apex angle and a second prism having a second apex angle that is distinct from the first apex angle. The single integrated substrate also includes, on one of the first surface and the second surface, a second array of light-steering components, a respective component of the second array of light-steering components located at a respective distance greater than the predefined distance from the reference point and the respective component of the second array of light-steering components comprising an optical prism having an apex angle that is greater than the critical angle. The second array of light-steering components includes a third prism having a third apex angle that is distinct from the first apex angle and the second apex angle and a fourth prism having a fourth apex angle that is distinct from the first apex angle, the second apex angle, and the third apex angle. In some embodiments, the first array of light-steering components and the second array of light-steering components are located on the same surface. In some embodiments, the first array of light-steering components and the second array of light-steering components are located on opposite surfaces (e.g., the first array of light-steering components is located on the first surface and the second array of light-steering components is located on the second surface).

What is claimed is:

1. A beam deflector device, comprising:
 a single integrated substrate that has a planar entrance surface and a non-planar exit surface, wherein the single integrated substrate includes, on the non-planar exit surface:
 a first array of light-steering components, a respective component of the first array of light-steering components located at a respective distance less than a predefined distance from a reference point and the respective component of the first array of light-steering components comprising an optical prism having an apex angle that is less than a critical angle corresponding to an angle of incidence beyond which light is reflected by total internal reflection, wherein the first array of light-steering components includes a first prism having a first apex angle and a second prism having a second apex angle that is distinct from the first apex angle, wherein the first prism is in contact with the second prism; and
 a second array of light-steering components, a respective component of the second array of light-steering components located at a respective distance greater than the predefined distance from the reference point and the respective component of the second array of light-steering components comprising an optical prism having an apex angle that is greater than the critical angle, wherein the second array of light-steering components includes a third prism having a third apex angle that is distinct from the first apex angle and the second apex angle and a fourth prism having a fourth apex angle that is distinct from the first apex angle, the second apex angle, and the third apex angle, wherein the third prism is adjacent to, and separated by a distance, from the fourth prism.

2. The beam deflector device of claim 1, wherein: the first prism, the second prism, the third prism, and the fourth prism are configured to steer at least a portion of light passing through the planar entrance surface toward a common focal point of the beam deflector device.

3. The beam deflector device of claim 1, wherein: the first array of light-steering components and the second array of light-steering components are configured to steer a portion of light passing through the planar entrance surface toward a common focal point of the beam deflector device.

4. The beam deflector device of claim 1, wherein: the beam deflector device is configured to focus collimated light entering the beam deflector device through the planar entrance surface toward a common focal point of the beam deflector device.

5. The beam deflector device of claim 1, wherein: each component of the first array of light-steering components has an apex angle that is different from an apex angle of any other component of the first array of light-steering components; and each component of the second array of light-steering components has an apex angle that is different from an apex angle of any other component of the second array of light-steering components.

6. The beam deflector device of claim 1, wherein each component of the first array of light-steering components is arranged radially from the reference point and each component of the second array of light-steering components is arranged radially from the reference point.

7. The beam deflector device of claim 1, wherein each component of the first array of light-steering components is an annular prism and each component of the second array of light-steering components is an annular prism.

8. A method, comprising:
outputting a respective pattern of light from a two-dimensional array of pixels; and
transmitting the respective pattern of light through the beam deflector device of claim 1.

9. The beam deflector device of claim 1, wherein the first array of light-steering components and the second array of light-steering components are arranged linearly from the reference point.

10. The beam deflector device of claim 9, wherein: the first array of light-steering components and the second array of light-steering components are arranged linearly in two opposing directions from the reference point so that the reference point is located between a prism of the first array of light-steering components and a corresponding prism of the first array of light-steering components and between a prism of the second array of light-steering components and a corresponding prism of the second array of light-steering components.

11. The beam deflector device of claim 1, wherein: the apex angle of the respective component of the first array of light-steering components is defined by the planar entrance surface and an apex surface that is distinct from the planar entrance surface;
the respective component of the first array of light-steering components is configured to allow light entering the respective component through the planar entrance surface to exit from the respective component through the apex surface;
the apex angle of the respective component of the second array of light-steering components is defined by the planar entrance surface and an apex surface that is distinct from the planar entrance surface; and
the respective component of the second array of light-steering components is configured to allow light entering the respective component through the planar entrance surface to internally reflect from the apex surface of the respective component.

12. The beam deflector device of claim 11, wherein the apex surface is a planar surface.

13. The beam deflector device of claim 11, wherein: the respective component of the second array of light-steering components has an exit surface that is distinct from the planar entrance surface and the apex surface; and
the respective component of the second array of light-steering components is configured to allow light entering the respective component through the planar entrance surface to exit, after internal reflection from the apex surface of the respective component, from the respective component through the exit surface.

14. The beam deflector device of claim 13, wherein: the apex angle of each component of the first array of light-steering components is selected to steer a portion of light entering the respective component of the first array of light-steering components toward a common focal point of the beam deflector device; and
an exit surface angle, defined by the exit surface and the apex surface, and the apex angle of each component of the second array of light-steering components are selected to steer a portion of light entering the respective component of the second array of light-steering components toward the common focal point of the beam deflector device.

15. A display device, comprising:
a two-dimensional array of pixels, wherein each pixel is configured to output light so that the two-dimensional array of pixels outputs a respective pattern of light; and
the beam deflector device of claim 1 configured to transmit the respective pattern of light from the two-dimensional array of pixels.

16. The display device of claim 15, wherein the display device is a head-mounted display device.

17. The display device of claim 15, further comprising:
a two-dimensional array of lenses located between the two-dimensional array of pixels and the beam deflector device.

18. The display device of claim 17, wherein:
the two-dimensional array of lenses is configured to collimate light from the two-dimensional array of pixels.

19. The display device of claim 17, wherein:
the two-dimensional array of lenses includes a two-dimensional array of lens assemblies;
the two-dimensional array of lens assemblies, configured to be positioned at a respective distance from the two-dimensional array of pixels, includes a first group of multiple lens assemblies of a first magnification and a second group of multiple lens assemblies of a second magnification that is distinct from the first magnification;

the first group of multiple lens assemblies of the first magnification includes:
  a first lens assembly, and
  a second lens assembly that is distinct and separate from the first lens assembly;

the second group of multiple lens assemblies of the second magnification includes:
  a third lens assembly that is distinct and separate from the first lens assembly and the second lens assembly; and
  a fourth lens assembly that is distinct and separate from the first lens assembly, the second lens assembly, and the third lens assembly; and each of the first lens assembly, the second lens assembly, the third lens assembly, and the fourth lens assembly includes two or more lenses; and a spatial light modulator configured to selectively reduce transmission of light for the two-dimensional array of lens assemblies.

\* \* \* \* \*